(12) United States Patent
Amagai

(10) Patent No.: US 8,828,583 B2
(45) Date of Patent: Sep. 9, 2014

(54) BATTERY MODULE

(75) Inventor: Ryuichi Amagai, Zama (JP)

(73) Assignee: Nissan Motor Co. Ltd., Kanagawa (JP)

( * ) Notice: Subject to any disclaimer, the term of this patent is extended or adjusted under 35 U.S.C. 154(b) by 1153 days.

(21) Appl. No.: 11/640,776

(22) Filed: Dec. 18, 2006

(65) Prior Publication Data

US 2007/0141457 A1 Jun. 21, 2007

(30) Foreign Application Priority Data

Dec. 19, 2005 (JP) .................................. 2005-365387

(51) Int. Cl.
| | |
|---|---|
| H01M 6/46 | (2006.01) |
| H01M 2/02 | (2006.01) |
| H01M 2/26 | (2006.01) |
| H01M 2/10 | (2006.01) |
| H01M 2/30 | (2006.01) |
| H01M 2/06 | (2006.01) |
| H01M 10/48 | (2006.01) |
| H01M 2/08 | (2006.01) |
| H01M 2/18 | (2006.01) |
| H01M 10/46 | (2006.01) |
| H01M 2/04 | (2006.01) |

(52) U.S. Cl.
CPC ............... *H01M 2/06* (2013.01); *H01M 10/46* (2013.01); *H01M 2/021* (2013.01); *H01M 2/266* (2013.01); *H01M 2/1072* (2013.01); *H01M 2/0217* (2013.01); *H01M 2/0212* (2013.01); *H01M 2/305* (2013.01); *H01M 2/0275* (2013.01); *H01M 10/48* (2013.01); *H01M 2/0408* (2013.01); *H01M 2/08* (2013.01); *H01M 2/0267* (2013.01); *Y02E 60/12* (2013.01); *H01M 2/18* (2013.01)
USPC .......................................................... 429/152

(58) Field of Classification Search
USPC .................. 429/151, 152, 153, 154, 148, 149
See application file for complete search history.

(56) References Cited

U.S. PATENT DOCUMENTS

| 6,403,252 B1 * | 6/2002 | Chiang et al. ................... 429/96 |
| 2004/0016455 A1 * | 1/2004 | Oogami ........................ 136/244 |

(Continued)

FOREIGN PATENT DOCUMENTS

| EP | 1505670 A2 | 2/2005 |
| GB | 2278713 A | 12/1994 |

(Continued)

OTHER PUBLICATIONS

Case2. (2007). In the American Heritage® Dictionary of the English Language. Retrieved from http://www.credoreference.com/entry/hmdictenglang/case2.*

(Continued)

*Primary Examiner* — Melvin C Mayes
*Assistant Examiner* — Michael Forrest
(74) *Attorney, Agent, or Firm* — Osha Liang LLP

(57) ABSTRACT

A battery module includes a plurality of flat batteries stacked upon one another in a thickness direction. The plurality of flat batteries each have an outer cover and plate-shaped electrode terminals connected. A power generating element is sealed within the outer cover of each of the plurality of flat batteries. The electrode terminals include substantially flat plates connected to the power generating element and projecting out of the outer cover in a projecting direction. The electrode terminals of the plurality of batteries are electrically connected to each other. Each of a plurality of electrically insulating spacers receives the electrode terminals of more than one of the flat batteries and the spacers are stacked in the thickness direction of the flat batteries. At least one of the insulating spacers has an opening along a projecting direction of the electrode terminal so as to expose a portion of the electrode terminal while supporting the plurality of electrode terminals spaced from each other in the thickness direction of the flat batteries.

19 Claims, 40 Drawing Sheets

(56) References Cited

U.S. PATENT DOCUMENTS

| | | | |
|---|---|---|---|
| 2004/0021442 A1* | 2/2004 | Higashino | 320/112 |
| 2004/0043289 A1* | 3/2004 | Shimamura et al. | 429/162 |
| 2005/0123828 A1* | 6/2005 | Oogami et al. | 429/152 |
| 2006/0234119 A1* | 10/2006 | Kruger et al. | 429/160 |

FOREIGN PATENT DOCUMENTS

| | | | | |
|---|---|---|---|---|
| JP | 2001114157 A * | 4/2001 | | B62J 11/00 |
| JP | 2001-256934 | 9/2001 | | |
| JP | 2004-006141 | 1/2004 | | |
| JP | 2004006141 A * | 1/2004 | | H01M 2/10 |
| JP | 2006-092884 | 4/2006 | | |
| JP | 2006-210312 | 8/2006 | | |

OTHER PUBLICATIONS

European Search Report for EP Patent Application No. 06126435.4-2119, dated Jul. 8, 2010 (5 pages).

* cited by examiner (A)

(B)

(A)

(B)

(C)

(D)

(A)

(B)

(A)

(B)

(A)

(B)

(A)

(B)

(C)

BATTERY MODULE

BACKGROUND OF INVENTION

1. Field of Invention

The present invention relates to a battery module.

2. Background Art

Flat and thin batteries ("flat batteries") are known and used in the art. In flat batteries, power generating elements with cathode and anode electrode plates are sealed within a pocket-shaped outer cover made of a film member such as a laminate film. Plate-shaped electrode terminals, which are connected to the power generating elements sealed within the outer cover, project from the interior to the exterior of the outer cover. Japanese Laid-Open Patent Publication No. 2001-256934, which is herein incorporated by reference in its entirety, discloses a high power and high capacity battery module in which a plurality of flat batteries are stacked and electrically connected together in series and/or parallel. Another Japanese Laid-Open Patent Publication No. 2004-6141, is also incorporated by reference herein.

As used herein, "battery module" refers to a unit comprising a plurality of connected battery cells, whereas a "battery assembly" refers to a plurality of connected battery modules.

The use and design of battery assemblies having a specific application in vehicles presents a desire for two features. First, it may be desirable that battery assemblies are compact, which may be achieved by reducing the distance between individual flat battery cells as much as possible to reduce the size of the battery modules. Second, the structure of the battery module should not be negatively affected by vibrations. If the battery module is subjected to and affected by vibrations, the stress resulting from such vibrations can in turn affect the joints of the electrode terminals, etc, and thus the durability of the battery. Accordingly, there exists a continuing need for battery modules that are compact in size while maintaining a structure that is unaffected by vibrations.

BRIEF SUMMARY OF THE INVENTION

Embodiments of the present disclosure relate to a battery module and a method of forming a battery module. The battery module may include a plurality of flat batteries stacked upon one another in a thickness direction. Each of the plurality of flat batteries has an outer cover and plate-shaped electrode terminals connected. A power generating element is sealed within the outer cover of each of the plurality of flat batteries. The electrode terminals include substantially flat plates connected to the power generating element and projecting out of the outer cover in a projecting direction. The electrode terminals of the plurality of batteries are electrically connected to each other. There is a plurality of electrically insulating spacers that receive the electrode terminals of more than one of the flat batteries and the spacers are stacked in the thickness direction of the flat batteries. At least one of the insulating spacers has an opening along a projecting direction of the electrode terminal so as to expose a portion of the electrode terminal while supporting the plurality of electrode terminals spaced from each other in the thickness direction of the flat batteries.

Other aspects and advantages of the invention will be apparent from the following description and the appended claims.

DETAILED DESCRIPTION OF THE INVENTION

Exemplary embodiments of the present disclosure will be described with reference to the accompanying figures. Like items in the figures are shown with the same reference numbers.

In embodiments of the present disclosure, numerous specific details are set forth in order to provide a more thorough understanding of the invention. However, it will be apparent to one of ordinary skill in the art that the invention may be practiced without those specific details. In other instances, well-know features have not bee described in detail to avoid obscuring the invention.

Figure 1:
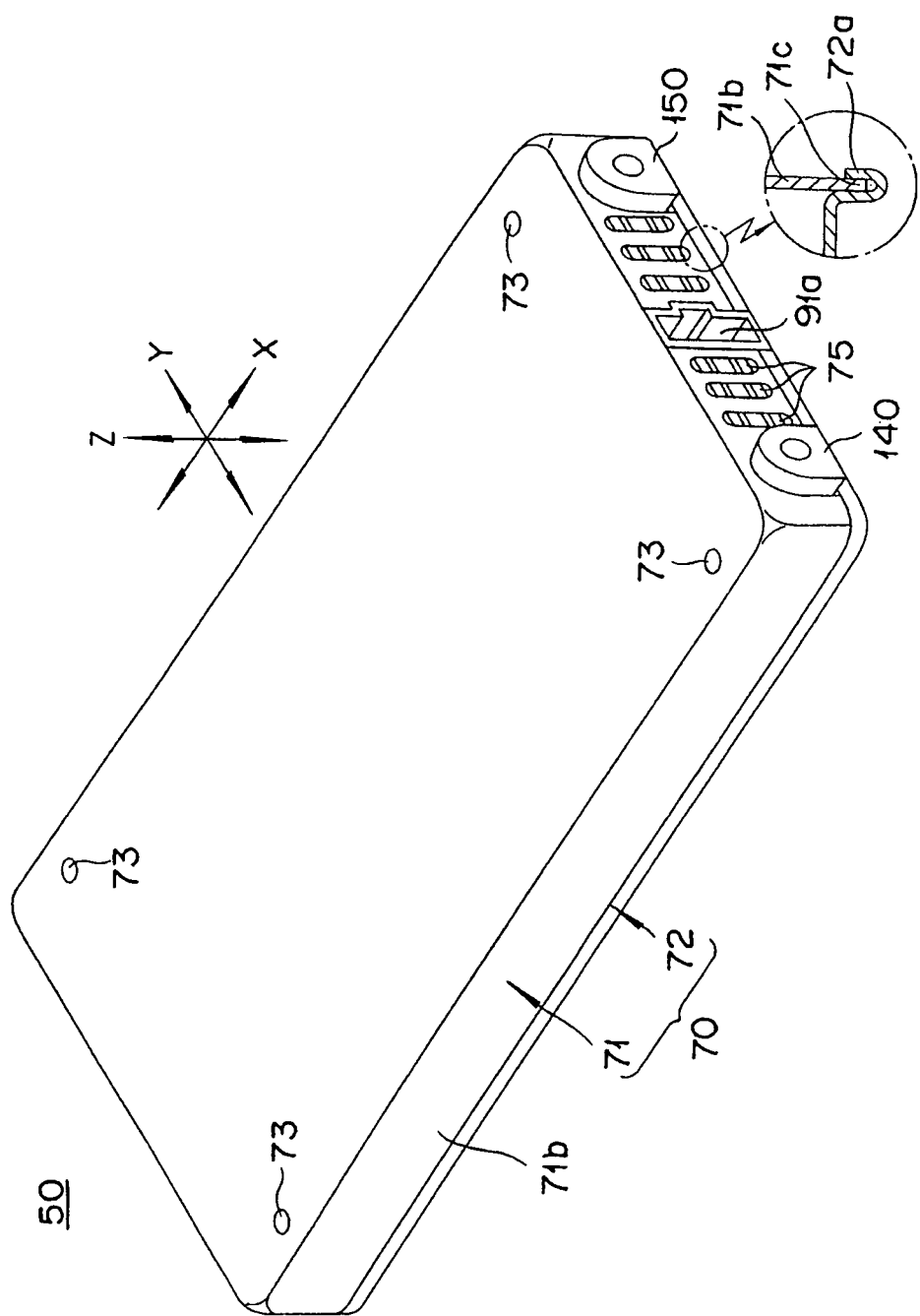
FIG. 1 is a perspective view showing a battery module constructed in accordance with an embodiment of the present invention.
Figure 2:
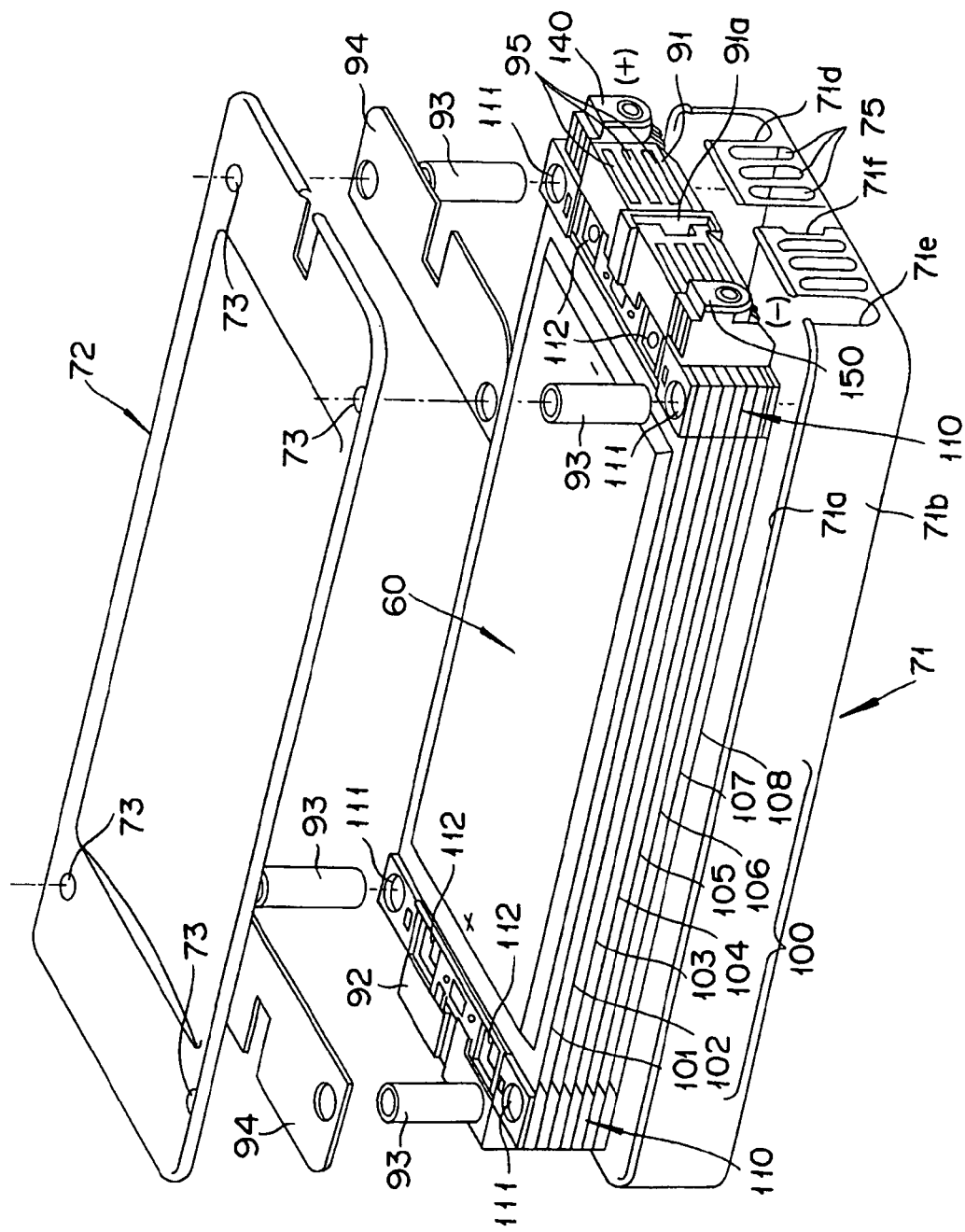
FIG. 2 is an exploded perspective view of the battery module of FIG. 1, wherein the battery module is inverted relative to FIG. 1.

FIGS. 1 and 2 show a battery module 50 constructed in accordance with an embodiment of the present disclosure. As shown in FIG. 1, the X-axis and Y-axis directions will sometimes be respectively referred to as longitudinal and lateral directions of the battery module 50, cell unit 60, case 70, etc. The Z-axis direction will sometimes be referred to as the vertical direction (referring to the depicted orientation) the thickness direction (referring to the thinnest direction of the batteries contained in the module), the stacked direction (referring to the stacking of one battery upon the next to form the battery module). As used herein with reference to the figures, the term "front surface" refers to the surface located at the front side orthogonal to the longitudinal direction (for example the font side through which electrical output terminals 140 and 150 project, as shown in the example of FIG. 1), and the term "back surface" refers to the surface located at the opposite the front side, namely at the back side also orthogonal to the longitudinal direction. In the example of FIGS. 1 and 2, the Battery has a largest dimension (length) in the longitudinal direction, a next largest (width) in the lateral direction, and a smallest dimension (thickness) in the thickness or stacked direction.

As shown in FIGS. 1 and 2, a battery module 50 includes a cell unit 60 disposed within a case 70. Cell unit 60 includes a plurality of flat batteries (hereinafter "batteries") 101-108, collectively referred to as batteries 100; and a plurality of insulating plates or spacers 121-138, collectively referred to as spacers 110, all of which are stacked along a thickness direction of the battery 100. It will be understood by those of ordinary skill in the art that the term "flat battery" is used to refer to a battery (as generally shown in the embodiment of FIGS. 1 and 2) that has a generally thin planar shape having a dimension in a thickness direction that is relatively smaller than the longitudinal and/or the lateral dimensions.

Referring to FIG. 2 the case 70 includes a box-shaped lower case 71 and an upper case 72. It will be understood by those of ordinary skill in the art that the terms upper and lower are for purpose of explanation relative the depiction of the component parts of the case 70 in the orientation shown in FIG. 2 and are not intended to be limited to the orientation depicted as other orientation might also be used without departing from certain aspect of the invention. Lower case 71 may includes walls 71b having edges 71c, which define an opening 71a in lower case 71. Upper case 72 corresponds to and forms a cover for opening 71a. Edge 72a of upper case 72 may be wound or crimped along an edge 71c of the surrounding wall 71b of the lower case 71, or otherwise fastened there along so that the upper case 72 engages with the lower case 71 (shown in an enlarged partial sectional view of the edge connection zone in FIG. 1). The lower case 71 and the upper case 72 may be made of a relatively thin, relatively rigid, formable plate, such as aluminum plate that is shaped via a process of pressing. Case 70 receives the cell unit 60 and has through-holes 75 on the front and back surface of lower case 71 (only the through-holes 75 through the front surface are shown in FIGS. 1 and 2) the through holes 75 extending through the case in a longitudinal direction. As used herein, the terms "front surface" and "back surface" refers to the surfaces located at the front side and the back side space apart along the longitudinal direction, such that the through-holes 75 in this embodiment extend longitudinally through the front and back sides of the case (as shown in FIG. 1). The through-holes 75 are usefully formed in groups of a number of through-holes 75 each extending parallel to the next and one above another in the vertical ("stacked") direction as shown in FIGS. 1 and 2. However it will be understood one of ordinary skill in the art would recognize that through-holes 75 may, for example, be provided in any number and/or in a lateral direction. And as such the specific number of through holes and specific geometry depicted is not intended to be a limitation on the scope of the present invention for all purposed.

Figure 3:
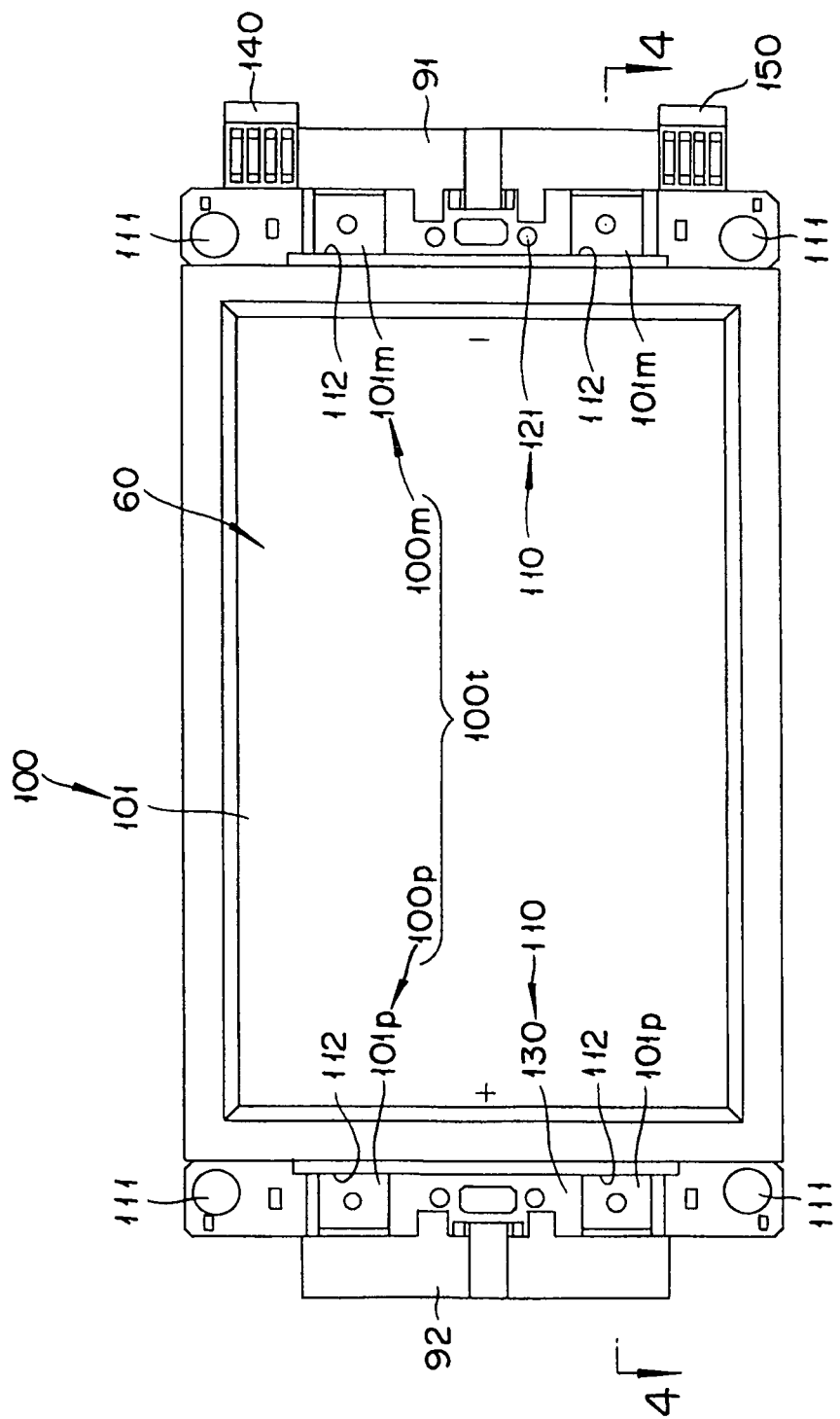
FIG. 3 is a top view showing a cell unit and an insulating cover disposed within a case.
Figure 4:
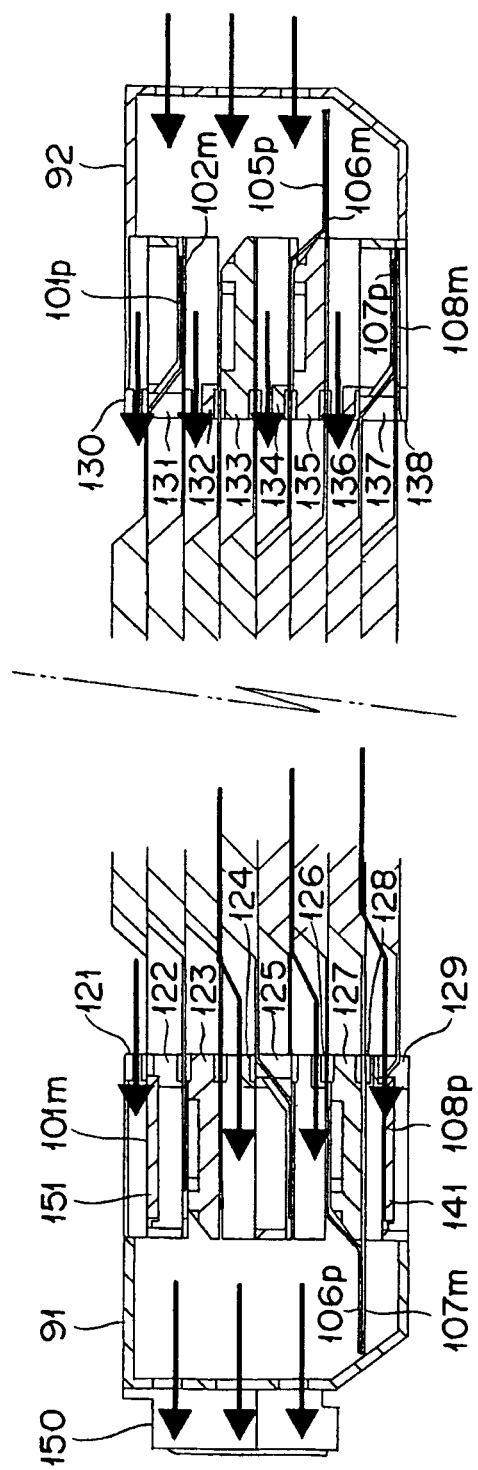
FIG. 4 is a cross-sectional view of FIG. 3 taken along the line 4-4.
Figure 5:
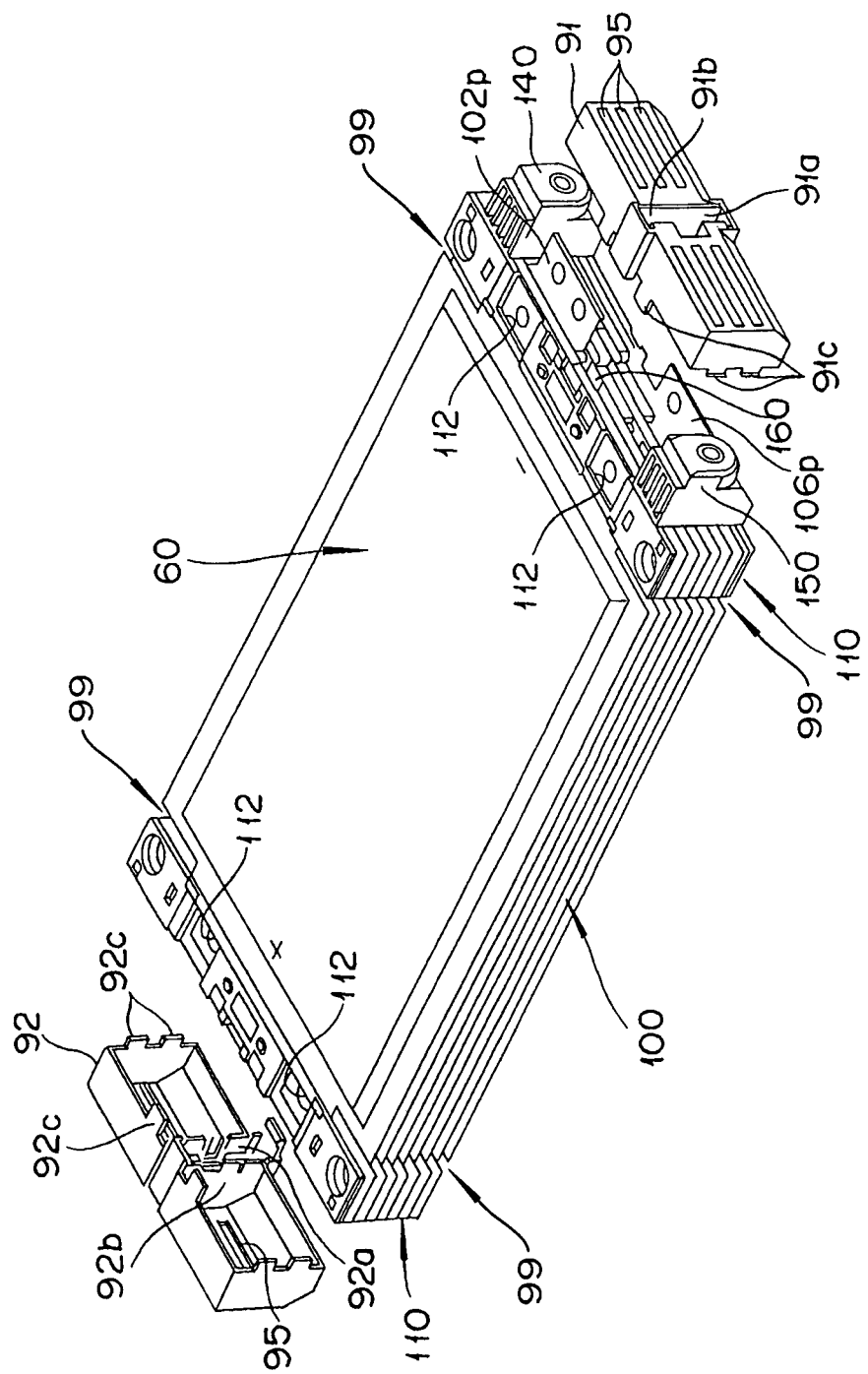
FIG. 5 is a perspective view showing a cell unit with a removed insulating cover.

Referring to FIGS. 3-5 various views of cell unit 60 are shown. In one or more embodiments as shown in FIGS. 3 to 5, cell unit 60 may include more than one or a plurality of batteries 100 having electrode terminals or tabs 100t on the terminal ends thereof. The tabs 100t are received by and held between spacers 110 (corresponding to and sometimes referred to herein as insulating plates), also stacked in the stacked direction (the vertical direction in the orientation of FIGS. 3-5). The batteries are electrically connected to output terminals 140 and 150 having positive and negative polarities, respectively. Thus, an electrically positive output terminal 140 and an electrically negative output terminal 150 are electrically connected to the appropriate electrode terminals or tabs 110t of the stacked batteries 100. As used herein, a tab 100t or tabs 100t refers to one or more or all of both positive-side tabs 100p (cathode electrode terminals) and negative-side tabs 100m (anode electrode terminals). As used herein positive-side tab 100p or tabs 100p collectively refers to one or more or all of the positive-side tabs 101p, 102p, 103p, 104p, 105p, 106p, 107p and 108p of the batteries 100, including individual batteries 101 to 108 in this example. As used herein negative-side tab 100m or tabs 100m collectively refers to one or more or all of the negative-side tabs 101m, 102m, 103m, 104m, 105m, 106m, 107m, and 108m of the batteries 101 to 108. Similarly, spacer 110 or spacers 110 collectively refers to one or more or all of the spacers 121 to 129 at the front side and 130 to 138 at the back side (not numbered in FIG. 5 for clarity, see FIG. 9). As shown and described, batteries 100 are stacked upon one another along the thickness direction of the battery and are connected to each other electrically in series. Thus, as more fully described with reference also to FIG. 12, one battery cathode (positive-side tab 101p) is connected to a next battery anode (negative-side tab 101m), in a series until all of the batteries 100 in a module are electrically connected and a cathode and an anode on either end of the series of batteries are electrically connected to the positive output terminal 140 and the negative output terminal 150, respectively. It will be understood by those of ordinary skill in the art that a battery module constructed by connecting a plurality of batteries in parallel may also be useful in one or more embodiments of the invention. For example, insulating spacers 110 placed and receiving battery tabs 100t there between and providing spacer openings, as will be describe more fully below, may also be useful in such a parallel battery embodiment not fully depicted in the example herein.

As shown in FIG. 5, insulating covers 91 and 92 are removably installed at the front and back surfaces of the cell unit 60. The insulating covers 91 and 92 overlay tabs 100t and spacers 110, and openings 112 or 212 there between (which will be described in greater below as cut-outs 112 or concave portions 212 depending upon the embodiment) so as to protect tabs 100t and ensure the electrical insulation between tabs 100t and case 70. Insertion openings 91a and 92a are formed in and through the insulating covers 91 and 92, respectively. The insertion openings 91a and 92a allow for connection to an external device (not shown) such as voltage detecting device or control device for detecting a voltage or controlling the charging or discharging of the battery via insertion of a connector (not shown in FIG. 5, see connector 170 in FIGS. 19B and 22 A-B). In the embodiment depicted the insertion openings 91a and 92a are centrally located between the output terminals 140 and 150. When a control connector is inserted into insertion openings 91a and 92a, it may connect to voltage detecting portions 160 of tabs 100t, or otherwise to voltage detecting portions 160 attached to tabs 110t. The voltage detecting device may detect the voltage of the battery 100 through the connector so as to provide for detection and/or control of the battery voltage or other functions such as control of charging, discharging and/or etc. of the battery module 50. Guide plates 91b and 92b may be installed at the inner side of the insulating covers 91 and 92 (the side of the covers 91 or 92 inward toward the batteries 100) for guiding the insertion and/or removal of the connector. Further, a plurality of snap-fit hooks 91c and 92c, or other fastening devices, may be installed along the periphery of the insulating covers 91 and 92 to engage with and secure the insulating covers 91 and 92 to spacers 110 and/or to output terminals 140 and 150. When attached, insulating covers 91 and 92 overlay the positive-side tabs 100p, the negative-side tabs 100m, and the spacers 110. The insulating covers 91 and 92 are provided with through-holes 95 on a surface outward from and opposite to exposed portions of tabs 100t and spacers 110 (an area referred to as an opening 200 or an open area 200 as described below with reference to FIGS. 19A and 20). The through-holes 95, as shown in FIG. 5, are formed as a plurality of groups of elongated open areas extending parallel in a lateral direction and extending through the covers 91 and 92 in the longitudinal directions. However, similar to through-holes 75, the number and geometry of through-holes 95 is not intended to be a limitation on the scope of the present invention and those of ordinary skill in the art upon reading the disclosure will understand that variations may be made without departing from certain aspects of the invention.

Referring back to FIGS. 1 and 2, positive-side and negative-side output terminals 140 and 150 project outwardly from the case 70 through cutouts 71d and 71e, respectively, formed at a portion of the surrounding wall 71b of lower case 71. Surrounding wall 71b may also include cutout 71f though which the insertion openings 91a and 92a of the insulating covers 91 and 92 may project outwardly from the case 70.

Lower case 71 and upper case 72 may include bolt holes 73 that are formed at the four corners thereof. Similar, spacers 110 may include bolt holes 111 formed therein at locations corresponding the bolt holes 73 so that bolts (not shown) can pass through the four corners of the case 70 and through the bolt holes 111 of the spacers 110. A sleeve 93 may be inserted into the bolt holes 111 of the spacer 110. Additionally, a cushion member 94 or cushion members 94 may be installed between the cell unit 60 and the upper case 72. In addition, a plurality of battery modules 50 may be combined to form a battery assembly (not shown) by bolts inserted through the bolt holes 73.

As described above, case 70 receives cell unit 60 having batteries 100 and spacers 110 with insulating covers 91 and 92 attached thereto. By inserting and fastening the bolts through bolt holes 73, the sleeves 93, and bolt holes 111, the location of the spacer 110 relative to the case 70 may be fixed. Further, because spacers 110 hold tabs 100t therebetween, fixing the location of the spacer 110 may also fix the location of batteries 100 relative to case 70.

A volume space 99 (designated at several locations for example in FIG. 5) may be provided between the inner surface of the case 70 and batteries 100, which may be in fluid communication with the openings 200 that technically include volumes defined by open areas 200 extending between spacers 110 and tabs 100t, as described below with reference to FIGS. 19A and 20. In addition, through-holes 95 provided in the insulating covers 91 and 92 may also be in fluid communication with through-holes 75 provided in the lower case 71, and open area 200 provided between the spacers 110 and may be in fluid communication with the outside of the case 70 via the through-holes 75 and 95 to provide cooling flow of air or another fluid through the case 70 with batteries 100 therein.

Figure 6:
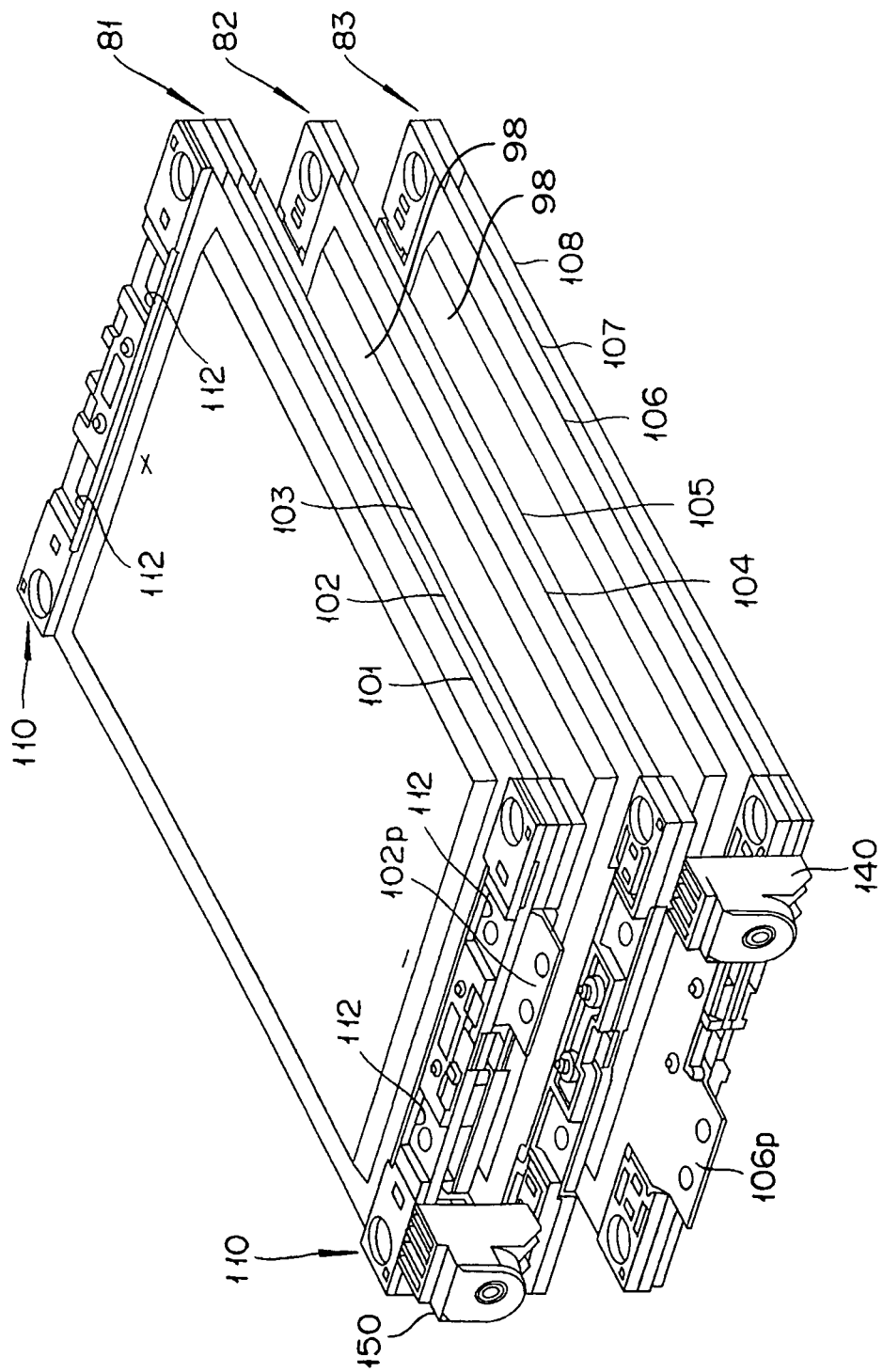
FIG. 6 is a perspective view showing three sub-assemblies constructing the cell unit wherein the front sides of the sub-assemblies are oriented forward.
Figure 7:
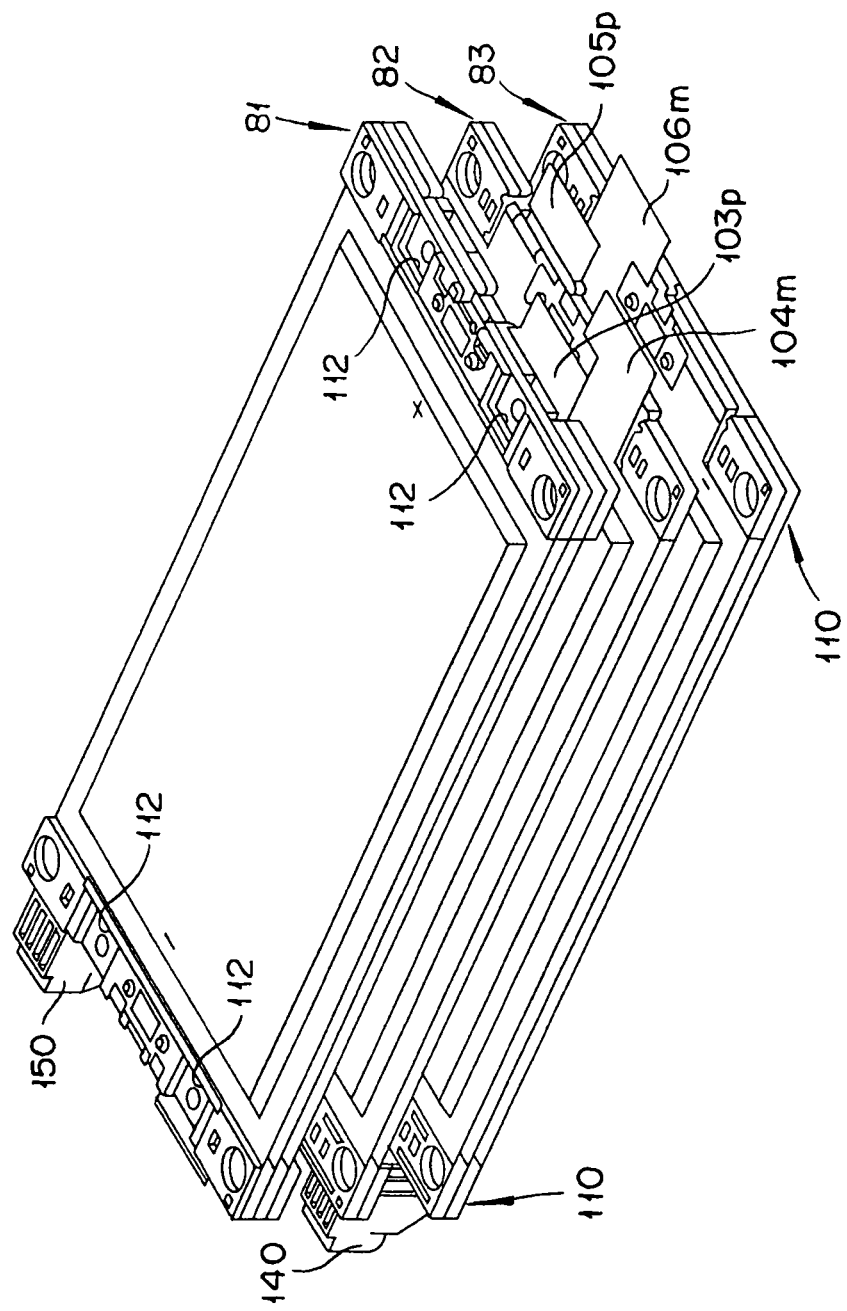
FIG. 7 is a perspective view showing the sub-assemblies of FIG. 6 wherein their back sides are oriented forward.
Figure 8:
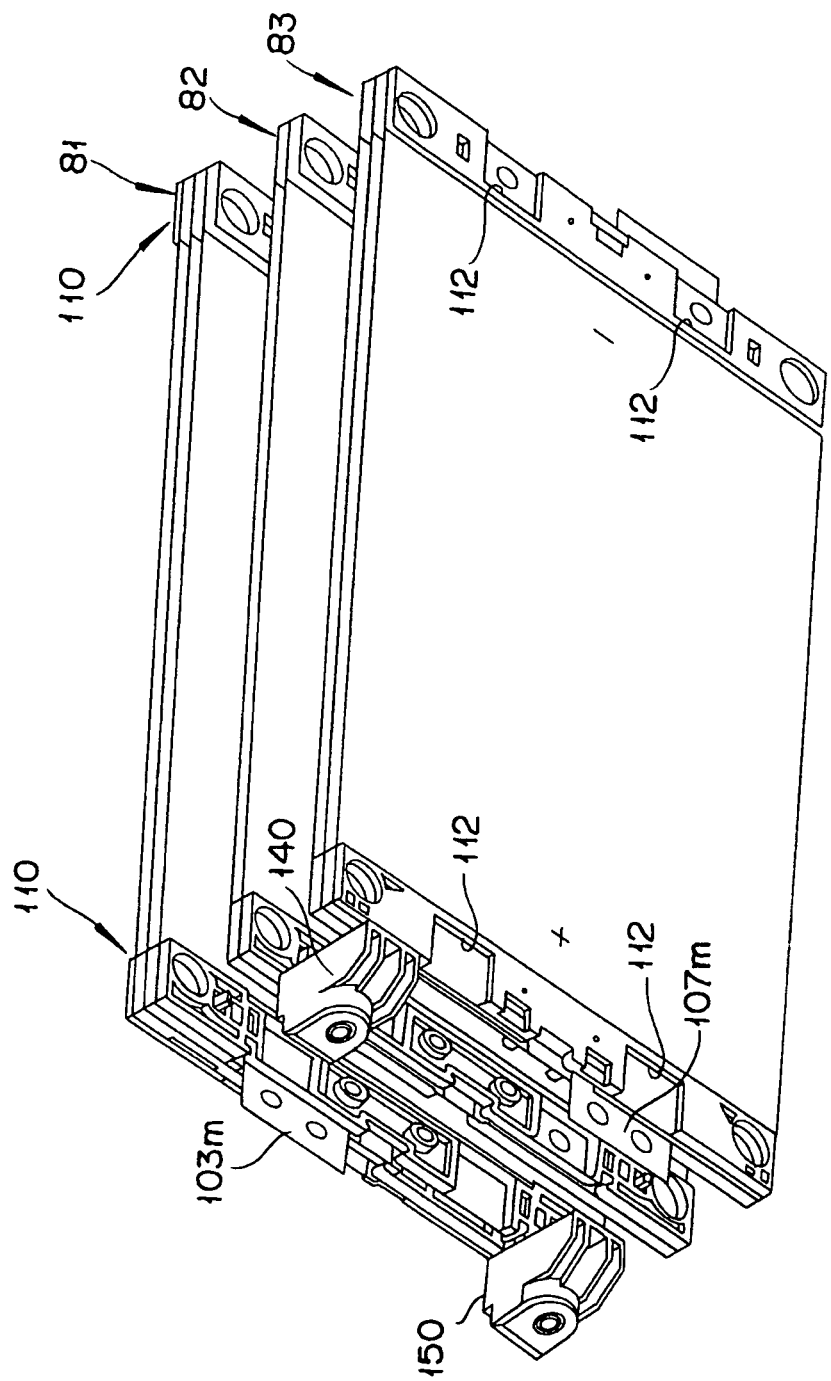
FIG. 8 is a perspective view showing the sub-assemblies of FIG. 6 from their bottom sides.

Referring to FIGS. 6 to 8 various partial assembly views of three sub-assemblies 81, 82, and 83 are shown. FIG. 6 shows a front side perspective view of the subassemblies 81, 82, and 83 from a top angle oriented with output terminals 140 and 150 in a forward direction. FIG. 7 shows the sub-assemblies 81, 82, and 83 in a back side perspective view from a top angle and FIG. 8 shows the sub-assemblies 81, 82, and 83 in a front perspective view from a bottom angle. In the embodiment shown in FIGS. 6 to 8 the sub-assemblies 81, 82, and 83 may be combined to construct or otherwise form the cell unit 60. Cell unit 60 is assembled using the first to third sub-assemblies 81, 82, and 83. The first sub-assembly 81 is shown located at the top and is constructed such that three batteries 101, 102, and 103 are stacked upon one another and are electrically connected in series. The second sub-assembly 82 is shown located in the middle is constructed such that two batteries 104 and 105 are stacked upon one another and are electrically connected in series. The third sub-assembly 83 is shown located at the bottom and is constructed such that three batteries 106, 107, and 108 are stacked upon one another and are electrically connected in series. The first, second and third sub-assemblies 81, 82, and 83 respectively, are electrically connected to each other in series. By joining the outwardly facing tabs 103p and 104m at the back side, the first sub-assembly 81 and the second sub-assembly 82 are electrically connected to each other in series. Similarly, by joining the outwardly facing tabs 105p and 106m at the back side, the second sub-assembly 82 and the third sub-assembly 83 are electrically connected to each other in series. The negative-side output terminal 150 is attached to the first sub-assembly 81 and the positive-side output terminal 140 is attached to the third sub-assembly 83. In addition, the sub-assemblies 81-83 may be bonded together at 98, for example by using a double-sided tape 98 between battery 103 of the first sub-assembly 81 and battery 104 of the second sub-assembly 82, as well as between battery 105 of the second sub-assembly 82 and battery 106 of the third sub-assembly 83.

Figure 9:
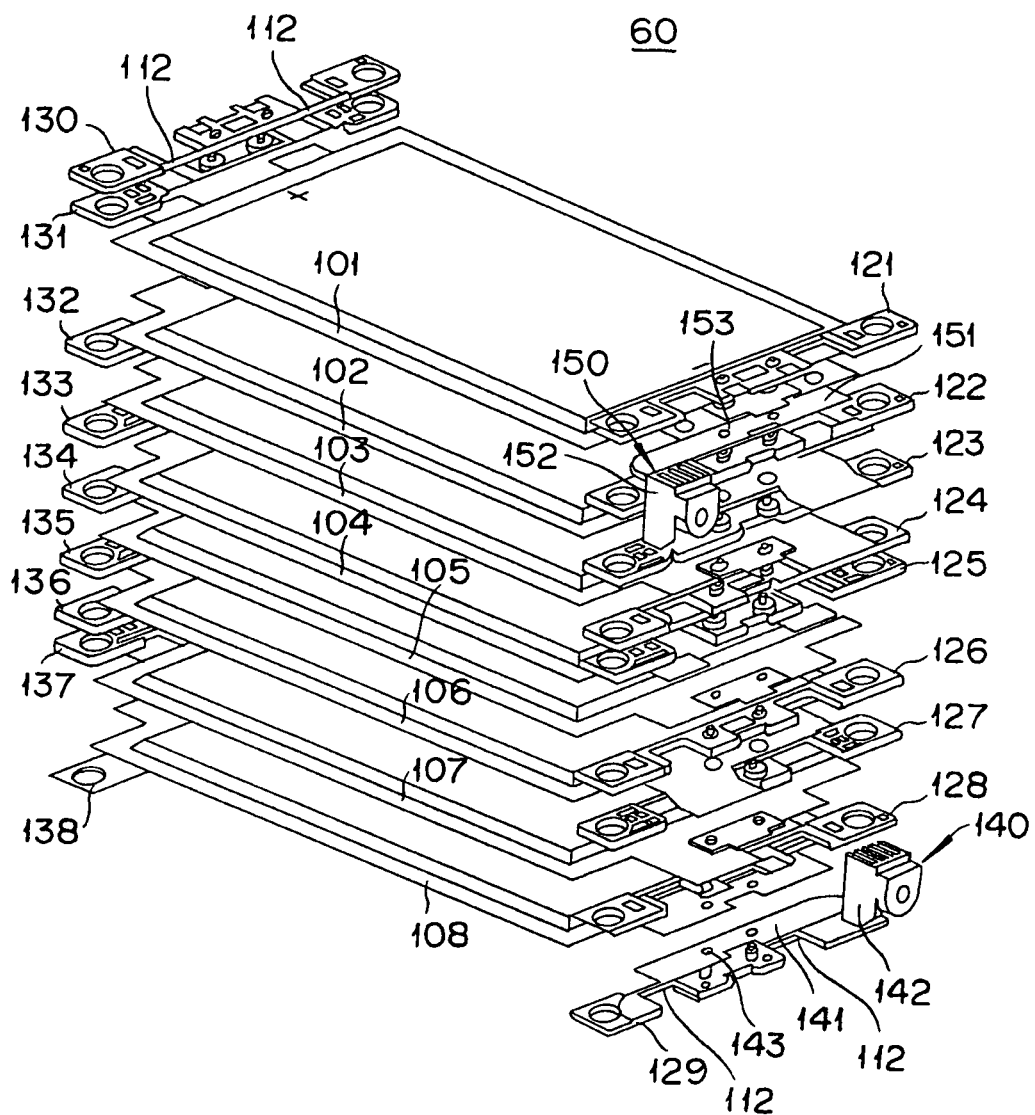
FIG. 9 is an exploded perspective view showing the cell unit in which its front side is oriented forward.
Figure 10:
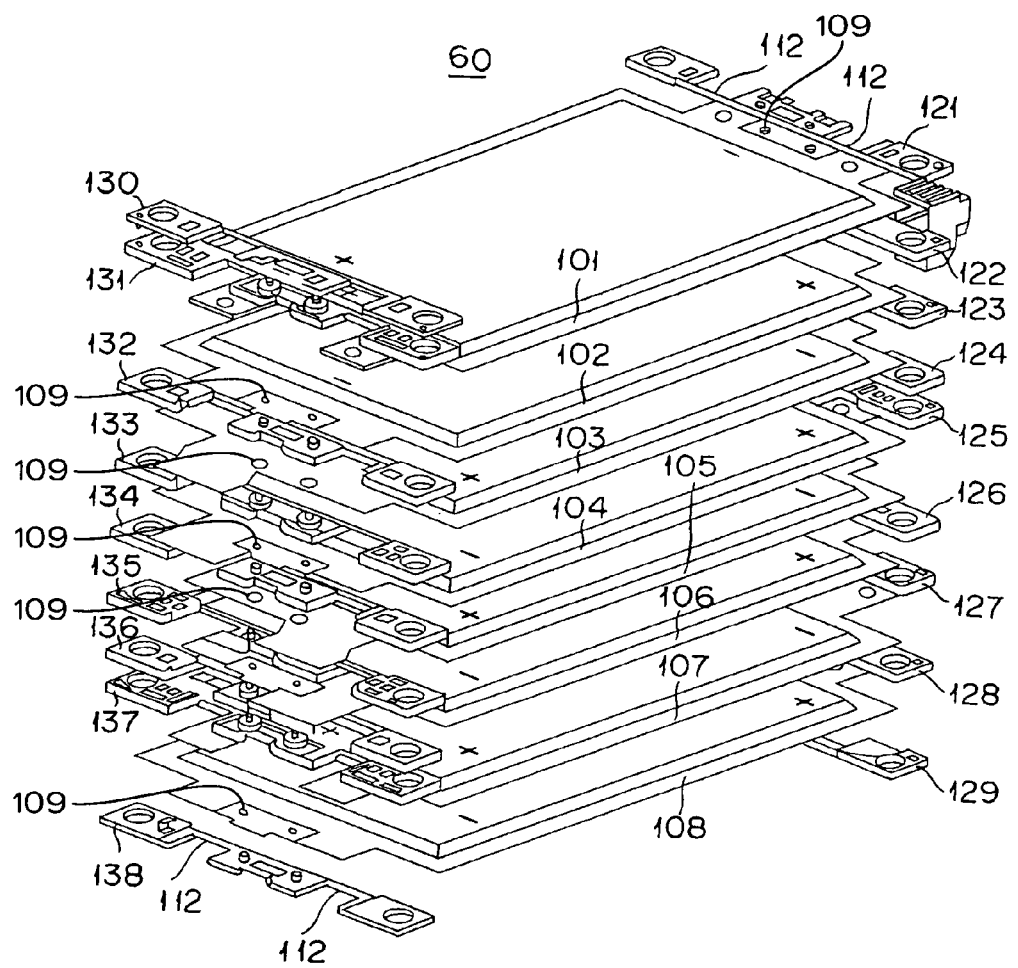
FIG. 10 is an exploded perspective view showing the cell unit in which its back side is oriented forward.
Figure 11:
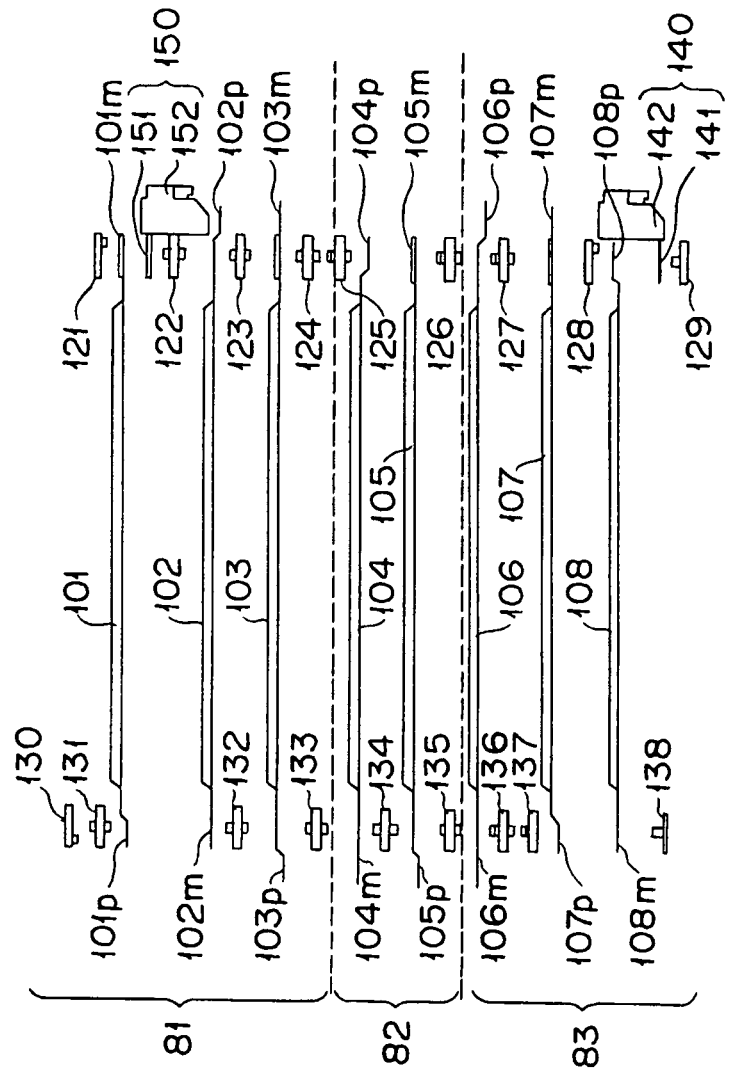
FIG. 11 is a conceptual diagram illustrating a flat battery and an insulating plate stacked upon one another in the cell unit.

Referring to FIGS. 9 to 10 exploded perspective views are shown of an embodiment of the cell unit 60, with a side view diagram FIG. 11 further illustrating the same. As shown in FIGS. 9 to 11, the cell unit 60 includes eight batteries 101 to 108, eighteen spacers 121 to 138 and two output terminals 140 and 150. Among the eighteen spacers 121 to 138, nine spacers 121-129 are disposed at the front side toward the output terminals 140 and 150, and nine spacers 130 to 138 are disposed at the back side. For convenience of description, batteries 101 to 108 will be referred to as first battery 101 to eighth battery 108 starting from the top to the bottom along the stacked direction of the batteries (vertically up to down direction in FIGS. 9-11); the nine spacers 121 to 129 at the front side will be referred to as first spacer 121 to ninth spacer 129 in the same order defined above; and the nine spacers 130 to 138 at the back side will be referred to as tenth spacer 130 to eighteenth spacer 138 in the same top to bottom order defined above.

Referring to FIG. 11, the first to eighteenth spacers 121 to 138 are disposed such that the tabs 100t are receive by and between the spacers disposed along the stacked direction of the batteries. The positive-side output terminal 140 includes a conductive bus bar 141 and resin cover 142 overlaying the terminal 140 installed at an end of the bus bar 141. The bus bar 141 has a plate-shape and is aligned with the positive-side tab 108p of the eighth battery 108. The negative-side output terminal 150 similarly includes a conductive bus bar 151 and a resin cover 152 overlaying the terminal 150 installed at an end of the bus bar 151. The bus bar 151 has a plate-shape and is aligned with the negative-side tab 101m of the first battery 101. Bus bars 141 and 151 may, in one embodiment, be made of a conductive metal such as a copper substrate. With reference to FIG. 9, the resin cover 142 of the positive side terminal 140 is located at the right end of the bus bar 141 when viewed from the front side. Conversely, in the resin cover 142 of the negative-side output terminal 150 is located at the left end of the bus bar 151. Bus bars 141 and 151 are each provided with a pair of through-holes 143 and 153, respectively, passing therethrough in the stacked direction.

Figure 12:
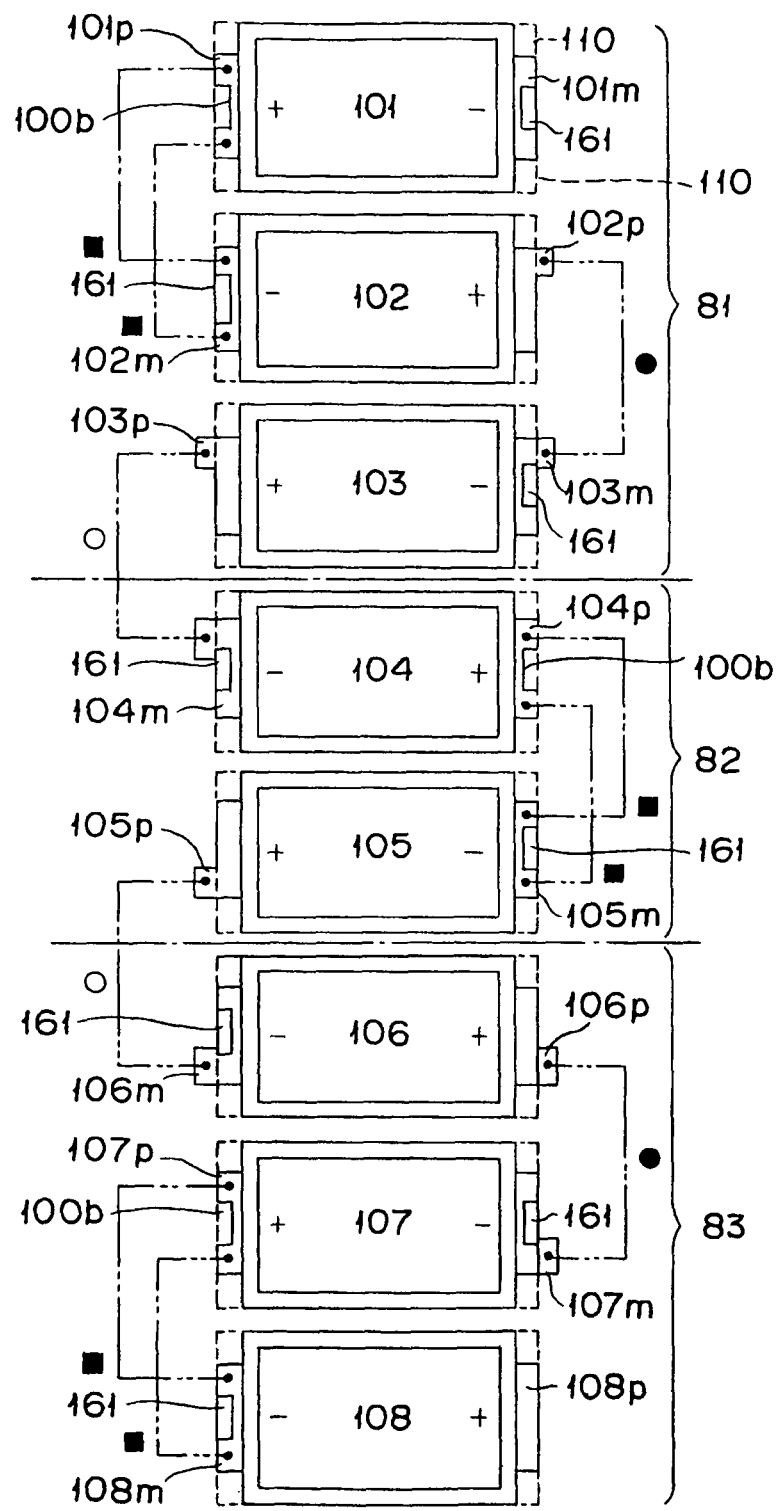
FIG. 12 is a conceptual diagram illustrating the electrical connection of the flat batteries in the cell unit.
Figure 13:
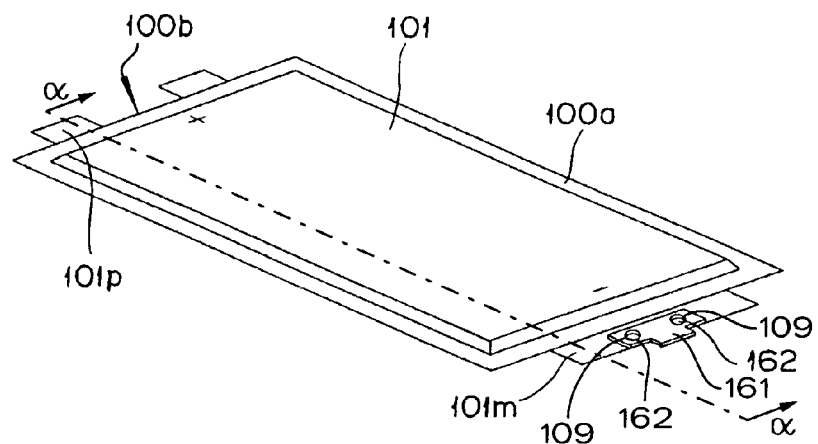
FIG. 13(A) is a perspective view showing an exemplary flat battery included in the cell unit.
FIG. 13(B) is a schematic cross sectional view of the flat battery of FIG. 13(A) along section line α-α.
Figure 13:
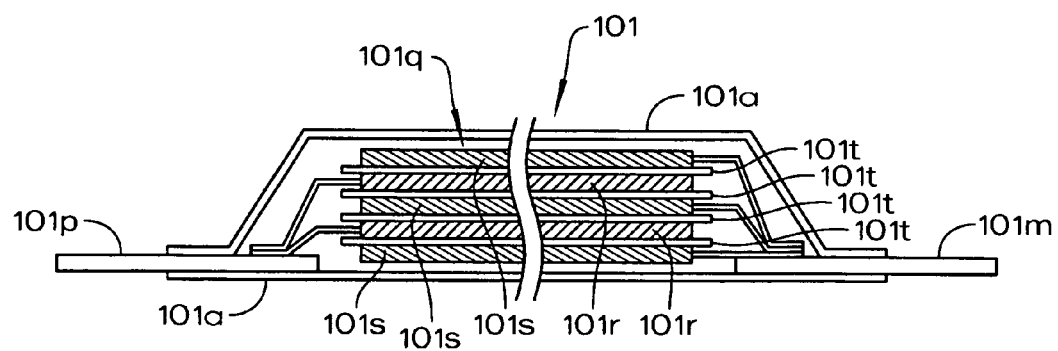

FIG. 12 is a diagram illustrating the electrical connection of the batteries 100 in the cell unit 60. FIG. 13A is a perspective view showing an example battery 101 representing one of the batteries 100 that may be included in the cell unit 60. FIG. 13B is a cross sectional view taken along section line α-α in FIG. 13A of the example battery 101.

As shown in FIGS. 12, 13A and 13B, the battery 101 may be a flat lithium ion secondary battery. Those of ordinary skill in the art will understand based upon the disclosure that the power generating element $101q$ (see FIG. 13B, showing a cross-sectional view taken along section line α-α of FIG. 13A) of such a battery 101 is internal to a pocket-shaped outer cover 100a and may include a stacked cathode plate 101r and an anode plate 101s with a separator 101t therebetween or a plurality of stacked cathode electrode plates 101r, anode electrode plates 101s, and separators 101t therebetween that are sealed within the pocket-shaped outer cover 100a. The pocket-shaped outer cover 100a may be made from a film-type material such as a laminate film, etc. The battery 101 is provided with a thin-plate type positive tab 101p and a thin-plate type negative tab 101m. The tab 101p is formed such that one end of the tab 101p is electrically connected to the cathode electrode plate or plates 101r, of the power generating element $101q$ within the outer cover 100a and the other end of the tab 101p projects outwardly from outer cover 100a to serve as a cathode electrode terminal, referred to herein as a tab 101p. For the example of a lithium ion battery, the tab 101p may be made, for example, from aluminum. Similarly, tab 101m is formed such that one end of the tab 101m is electrically connected to the anode electrode plate or plates 101s of the power generating element within the outer cover 100a and the other end of the tab 101m projects outwardly from the outer cover 100a to serve as an anode electrode terminal, referred to herein as tab 101m. For the example of a lithium ion battery, the tab 101m may be made, for example, from copper.

Tabs 100t (and for purposes of discussion here, tab 101p and tab 101m) extend from both sides (front side and back side) in a longitudinal direction outward from the battery 101. In such a battery having a stack of charged elements (anode 101r and cathode plates 101s), it may be desirable to apply a pressure on the charged elements along the stacked direction of the electrode plates to maintain a distance between the cathode electrode plates 101s and the anode electrode plates 101r as well as to achieve optimal performance of the battery. Accordingly, when each battery is covered within the case 70 pressure may be applied against both sides in the stacked direction so that the charged elements $101q$ and thus the cathode and the anode electrode plates 101r and 101s within each battery are also pressed together with spacers 101t therebetween. While FIGS. 12, 13A and 13B refer to the structure of battery 101 as an example, one of ordinary skill in the art would recognize that the same battery structure described above may be generally applicable to any of batteries 101 to 108.

As also shown in FIG. 13A, a terminal plate 161 (corresponding to a voltage detecting terminal plate), may be joined to negative-side tab 100m. In one example the terminal plate 161 may include one or more of a pair of through-holes 162 formed therein. Through-holes 109 may be formed in tab 100m in alignment with through-holes 162 of the terminal plate 161 when the tabs 100m on alternating stacked batteries are oriented on the same side as the terminal plate 161 (shown in FIG. 23B). Through-holes 109 may also be formed in the positive-side tab 100p. Similarly, the through-holes 109 may also be formed in the positive-side tabs 102p, 103p, 105p, 106p and 108p of the second, third, fifth, sixth and eighth batteries 102, 103, 105, 106 and 108 (shown in FIGS. 9 and 10). Thus, the through-holes 109 and 162 penetrate through tabs 100t and terminal plates 161 along the stacked direction.

FIG. 14A shows a top perspective view and FIG. 14B shows a bottom perspective view of the spacers 110 that correspond to the fourth, sixth, twelfth, fourteenth and sixteenth spacers 124, 126, 132, 134, and 136 constructed in accordance with an embodiment of the present disclosure. FIGS. 14C and 14D show cross-sectional views taken along section lines C-C and D-D of FIG. 14A, respectively. As shown in FIGS. 14A-D, the spacer 110 may be a planar member that receives and accommodates tabs 100t from both sides of the spacer 110 along a stacked direction of the batteries 100. A bolt hole 111 for insertion of the sleeve 93 (shown in FIG. 2) penetrates through spacers 110 in a stacked direction of the spacer 110. The spacers 110 may be made from an electrically insulated material (e.g., resin), however, as long as the material of the spacers 110 is electrically insulated and has a sufficient strength to receive and retain tabs 100t, various types of spacers may be used without departing from certain concepts of the invention. Insulating covers 91 and 92 may also be made of the same or similar insulating material as that of spacers 110.

Figure 14:
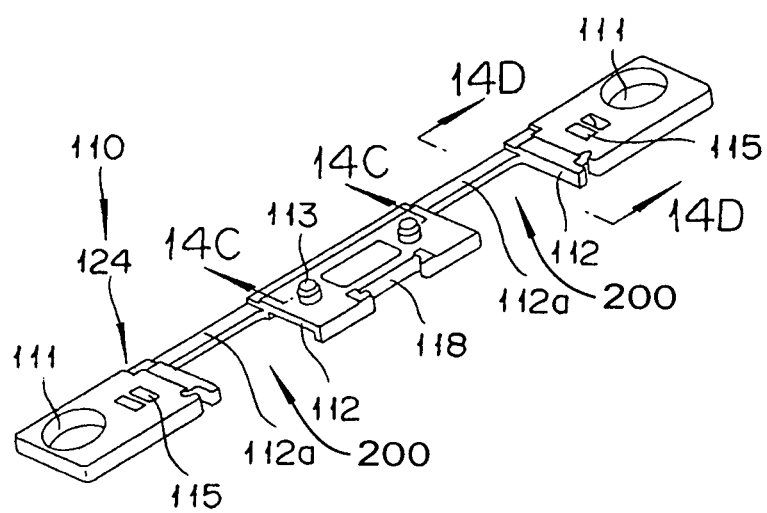
FIG. 14(A) is a perspective view showing an exemplary insulating plate included in the cell unit.
FIG. 14(B) is a perspective view of the insulating plate inverted inside out.
FIG. 14(C) is a cross-sectional view of FIG. 14(A) taken along the line 14C-14C.
FIG. 14(D) is a cross-sectional view of FIG. 14(A) taken along the line 14D-14D.
Figure 14:
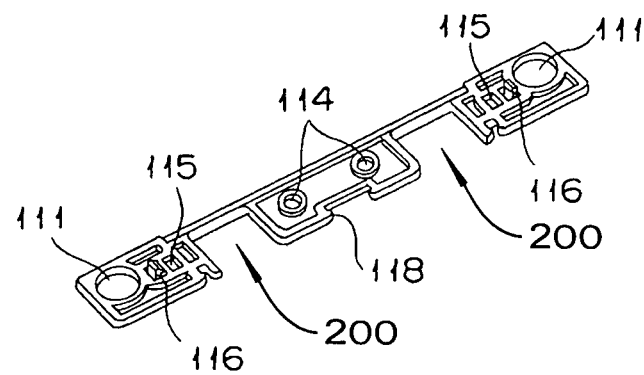
Figure 14:
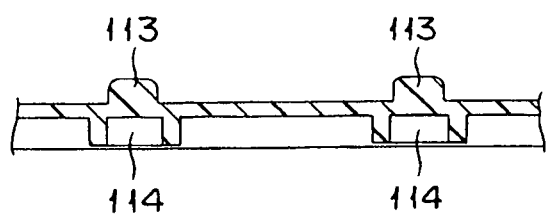
Figure 14:
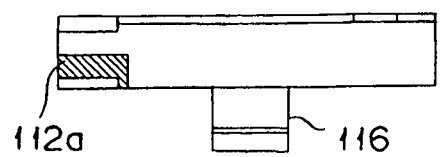

Each spacer 110 is constructed to provided openings referred to generally as openings 200 or open areas 200, as for example in the embodiment depicted openings 200 may comprise a pair of cut-outs 112 formed at locations corresponding to positive-side tabs 100p and negative-side tabs 100m. In this embodiment, the cut-outs 112 penetrate through portions of each spacer 110 in the stacked direction. Connecting portions 112a connect the other portions of the spacers 110 across an interior edge (toward the batteries) of each of the cut-outs 112. As shown in FIG. 14, the connecting portion is also thinner in the stacked direction. Thus, this configuration provides a stepped portion at the connecting portion 112a that allow fluid communication from the interior volume space 99 of the case 70, so that for example when the spacers 110 are attached to the batteries 100, cooling air may blow through the cut-outs 112, into the battery case 70 and across the surfaces of the stacked battery 100. Cut-outs 112 open to the front side for spacers 110 disposed at the front side of the cell unit 60, whereas cut-outs 112 open to the back side for spacers 110 disposed at the back side of the cell unit 60. In other words, the opening 200 formed by cut-outs 112 is open in the direction in which tabs 100t protrude or project outward from the batteries, which may be referred to as the projection direction of the electrode terminals or tabs 100t. Although the rectangular-shaped cut-out 112 is preferably formed at two positions along the spacers 110, each cut-out 112 equidistantly spaced from the center of the spacer 110 in a lateral direction, such dimensions are not a limitation on the scope of the present invention. Rather, one of ordinary skill in the art would recognize that there may be modified embodiments as long as cut-outs 112 are open in the same direction as projecting tabs 100t.

In addition, spacer 110 is provided with a spacer to spacer connector, such as a pin (or embossment) 113 on one surface of the spacer 110 in the stacked direction and a pin receiving hole or pin receiving concave portion 114 on an opposite surface of the spacer 110 in the stacked direction. As shown in FIG. 14C, the pin 113 and the concave portion 114 are co-linear with each other in the stacked direction (shown in FIG. 14C). In one alternative embodiment the spacer connector usefully includes a pair of pins 113 and a pair of concave portions 114 formed proximate to the center of spacer 110 in a lateral direction (rather than at the cut-out 112).

In accordance with one embodiment of the present disclosure, pairs of spacers 110 are used together to receive and hold a tab 100t therebetween. In this embodiment at least one of the pair of spacers will be interposed between one tab 100t and another tab 100t. For example, as shown in FIG. 11, negative-side tab 101m is received and retained between a pair of first and second spacers 121 and 122, whereas positive-side tab 102p is received and retained between a pair of second and third spacers 122 and 123. Thus, as shown in this embodiment, the second spacer 122 is used to receive and retain both negative-side tab 101m and positive-side tab 102p. As such, the second spacer 122 is shared between two tabs 100t, namely between the upper tab 101m and the lower tab 102p to reduce the distance therebetween. By maintaining as short a distance as possible between the batteries 100 a compact battery module 50 may result.

Referring to FIGS. 15A-B, 16A-B and 17A-B, various perspective views of the tabs 100t and the negative-side output terminal 150 are shown according to one embodiment of the disclosure. As shown in FIGS. 15A and 15B, spacer 122 is provided with an engagement hole 115 penetrating from the top to bottom surface, and spacer 121 is provided with a snap-fit hook 116 protruding from the bottom surface. The snap-fit hook 116 of one spacer 110 (spacer 121 as shown in FIGS. 15A and 15B) is inserted into and engaged with the engagement hole 115 disposed in the surface of another spacer 110 (spacer 122 shown in FIGS. 15A and 15B). In other words, the spacers 110 may be usefully connected to each other by means of press-fitting them together so that snap fit hooks 16 on one spacer 110 engage in corresponding engagement holes 116 on a next spacer 110. Accordingly, this may provide for fast and easy connection between the spacers 110, which in turn allows fast and easy interposition of the tabs 100t.

Figure 15:
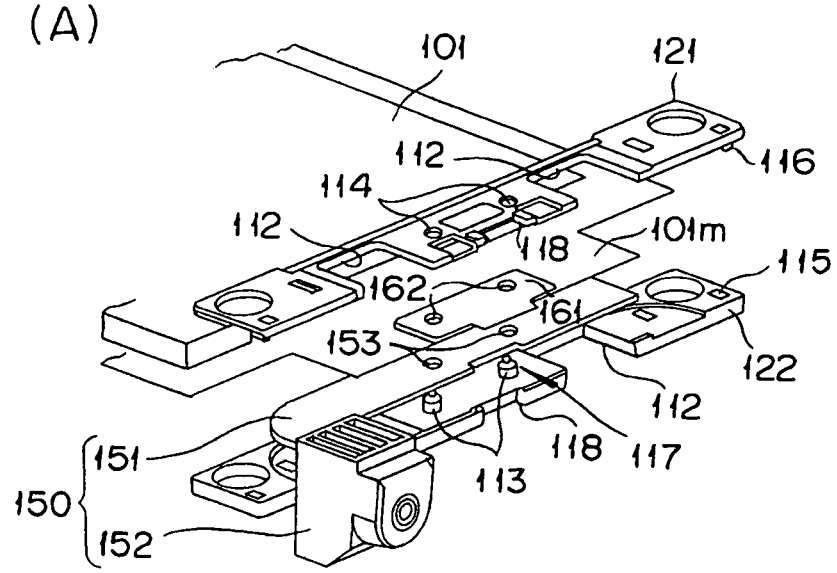
FIGS. 15(A) and 15(B) are perspective views illustrating a configuration in which one electrode and one output terminal are received and maintained by a pair of insulating plates.
Figure 15:
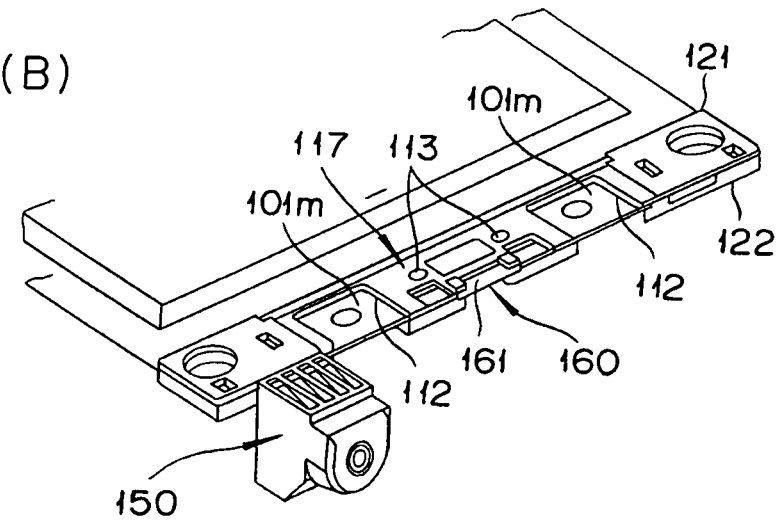
Figure 16:
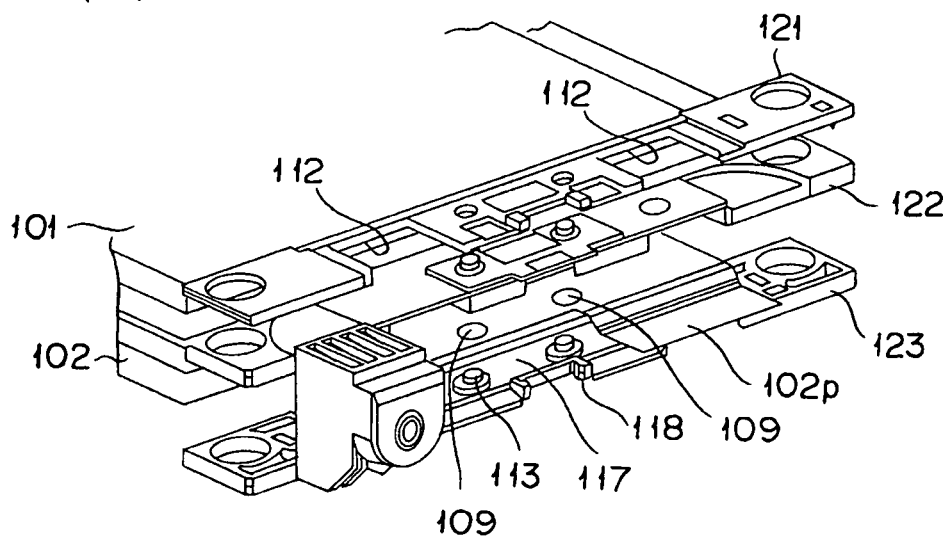
FIGS. 16(A) and 16(B) are perspective views illustrating a state in which the flat battery is disposed lower than that shown in FIG. 15(A).
Figure 16:
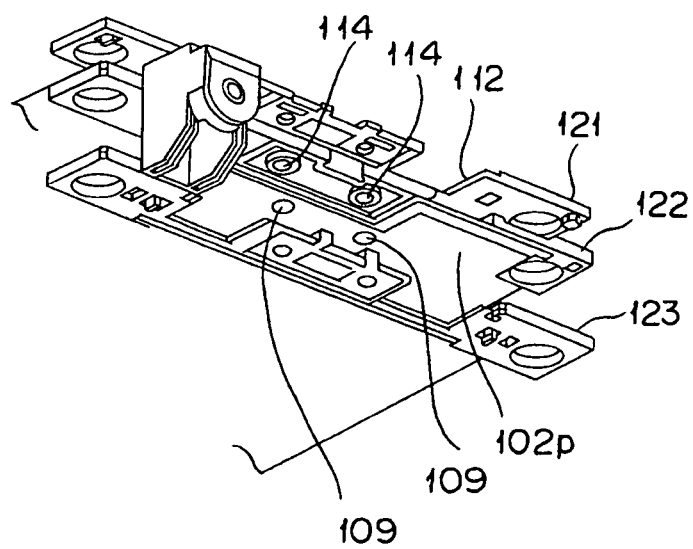
Figure 17:
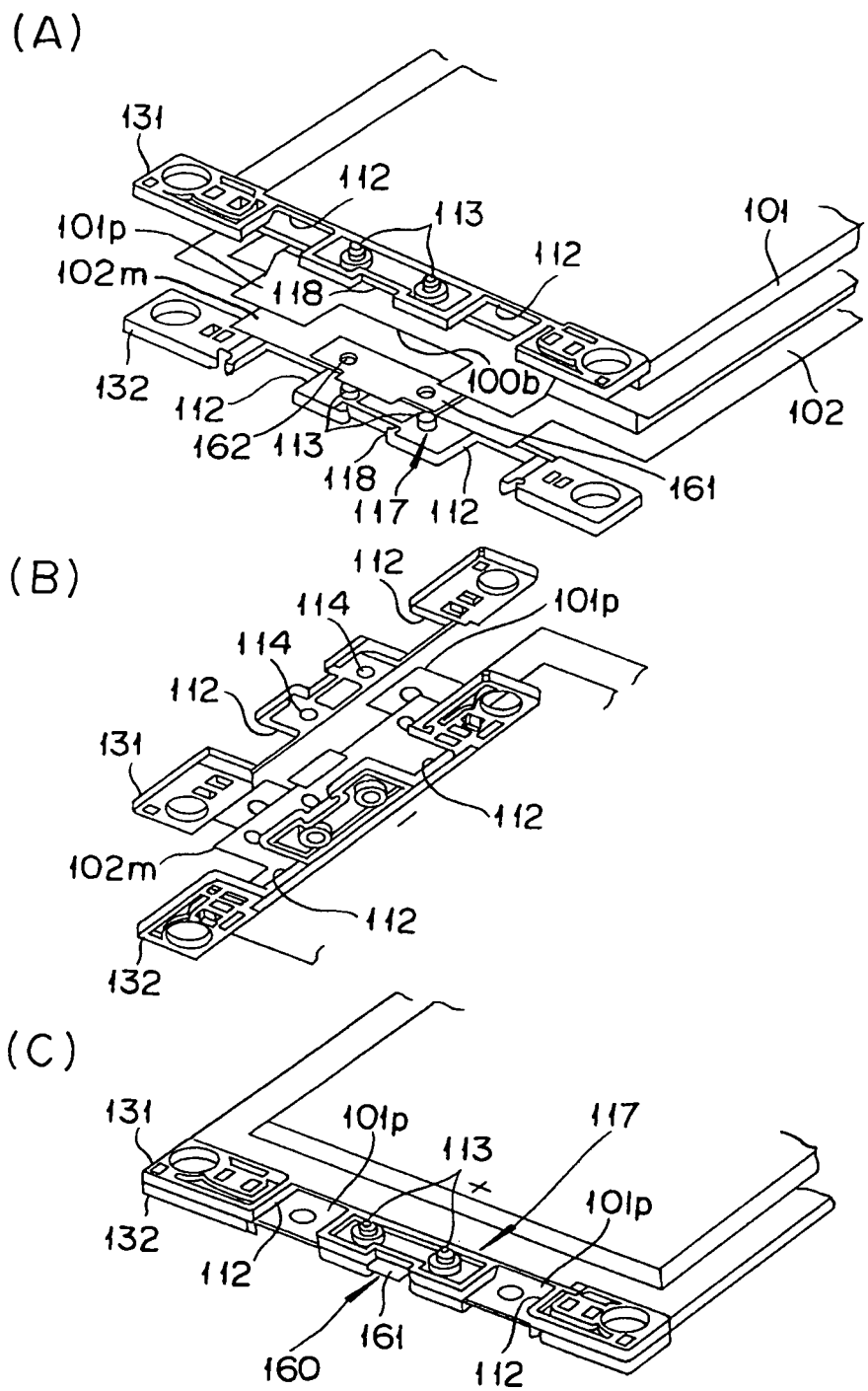
FIGS. 17(A), 17(B) and 17(C) are perspective views illustrating a configuration in which a plurality of electrodes are received and retained by a pair of insulating plates.

As shown in FIGS. 15 to 17, a pair of spacers 110, the spacers 121 and 122 in this example, includes a fixing mechanism 117 for fixing a tab 100t therebetween. For example, the fixing mechanism may include a pin 113 that is provided on one spacer 122 of a pair of spacers 121 and 122 and the pin 113 is inserted through one of the through-holes 109 penetrating tab 101m. Additionally, the fixing mechanism may include a concave portion 114 that is provided on the other spacer 121 to receive a tip or distal end of the pin 113, when the distal end of the pin 113 has passed through the through-hole 109 and the proximal end is therefore fully engaged in the trough-hole 109. Such a fixing mechanism may prevent spacers 121 and 122 from being misaligned relative to tab 101m when the battery module 50 is subjected to vibrations, thereby preventing a short-circuit among the tabs to result from such a misalignment.

In addition, in a process of stacking batteries 100 to assemble battery module 50, the distal end of the pin 113 of a lower spacer 110 is inserted into the concave portion 114 of an upper spacer 110, thereby allowing both the position of spacers 110 relative to tabs 100t and the relative position of the spacers 110 between the batteries 100 to be determined at the same time. As such, the positioning functions of the pin 113 and the concave portion 114 may be usefully workable when assembling battery module 50.

In one embodiment, the bus bar 141, the bus bar 151, the terminal plate 161, and the tab 100t have pairs of through-holes 143, 153, 162, and 109, respectively. A pin 113 is inserted through each of the pairs of through-holes to reduce and/or prevent any rotation. In a particular embodiment, a pair of through-holes 143, 153, 162, and 109 may have a circular-shape on one side and an elliptical or oblong shape on the other side so that pins 113 may be easily inserted into and passed through the holes.

As shown in FIG. 15, tab 101m and bus bar 151 of the negative-side output terminal 150 are aligned by a the pair of pins 113 and concave portion s 114 between the pair of spacers 121 and 122. A portion of the tab 101m and bus bar 151 are positioned in cut-out region 112. Tab 101m may be welded onto bus bar 151 via a welding head (not shown) that may be conveniently placed and activated for welding tab 101m to bus bar 151 during assembly to electrically connect output terminal 150 to the first battery 101. Spacers 121 and 122, having the indicated fixing pins 113 and concave portion 114 may serve as a jig to align tab 101m and bus bar 151 for welding tab 101m onto the bus bar 151. Because the welding head may fit within the cutout 112 to perform the welding operation, the ability to weld is good. The pin 113 of the second spacer 122 may be inserted through through-holes 153, 109, and 162 formed on the bus bar 151, negative-side tab 101m, and terminal plate 161, respectively, and into concave portion 114 of the first spacer 121, thereby positioning bus bar 151, negative-side tab 101m, and terminal plate 161. Once positioned, tab 101m and bus bar 151 are insulated by the spacers 121 and 122 from external contact or from contact with the case 70, except for a portion of tab 101m that is exposed by cutout 112 and voltage detector portion 160 that is exposed for connection to the connector 170 as describe above.

Referring to FIGS. 16A and B, tab 102p is received and retained by a pair of spacers 122 and 123 and only a portion of tab 102p extends or projects outward from the batteries beyond spacers 122 and 123. The pin 113 of the third spacer 123 may be passed through through-hole 109 of the second battery 102 and into the concave portion 114 of the second spacer 122, thereby positioning the positive-side tab 102p. In addition, the portion of positive-side tab 102p extending beyond spacers 122 and 123 may be attached to negative-side tab 103m (extending beyond spacers 123 and 124) so as to electrically connect the second battery 102 in series with the third battery 103 (shown in FIG. 11).

Referring to FIGS. 17A, B, and C, tabs 101p and 102m are aligned by a pair of spacers 131 and 132. Further, a portion of the tabs 101p and 102m are positioned in cut-out region 112. The portion of tabs 101p and 102m in the cut-out region 112 are welded and thereby physically and electrically attached to each other. For example the welding may be by means of ultrasonic welding, thereby electrically connecting batteries 101 and 102. Spacers 131 and 132 may serve as a jig to retain tabs 101p and 102m as tabs 101p and 102m are welded to each other. The pin 113 of the twelfth spacer 132 is inserted through through-holes 109 and 162 formed in negative-side tab 102m and the terminal plate 161, respectively, and into concave portion 114 of the eleventh spacer 131, thereby positioning terminal plate 161 and negative-side tab 102m. Thus, tabs 101p, 102m are insulated by spacers 121 and 122 except for a portion thereof exposed by cut-out 112 and voltage detector portion 160.

As shown in FIG. 11, the cell unit 60 may be constructed by connecting stacked batteries 100 in series, specifically by electrically connecting tabs 100p with tabs 100m, having opposite polarity to each other. Positive-side output terminal 140 and negative-side output terminal 150 are electrically connected to the end batteries in the stack, eighth and first batteries 108 and 101, respectively.

Figure 18:
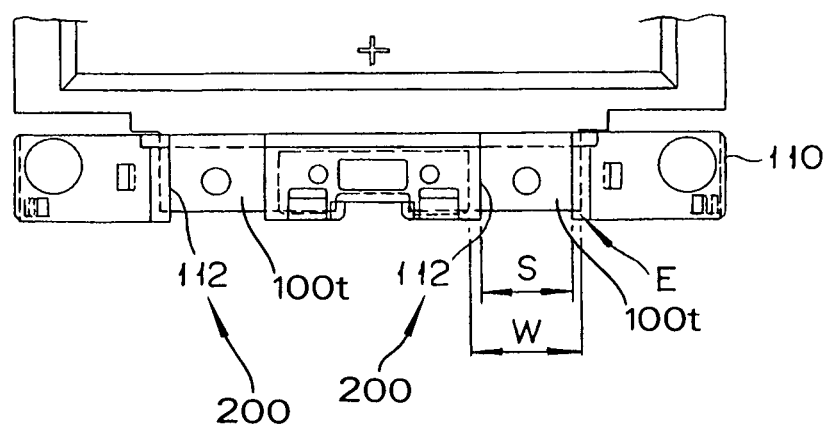
FIG. 18 is a top view illustrating a relationship between the width of a cut-out portion of an insulating plate and the width of an electrode.

Referring to FIG. 18, a useful relationship between the width of the cut-out 112 of the spacer 110 and the width of the tab 110t is shown. As shown in FIG. 18, the width S of cut-out 112 (i.e., also the width S of the open area 200) may be less than the width W of tab 100t, thus exposing a portion of tab 100t having a width S. Because tab 100t width W is greater than the exposed portion of tab 100t, or cutout width S, tab 100t extends a distance laterally on both side of cutout 112 to be covered by spacers 110. As such, tab 100t may be disposed, maintained, and aligned between the spacers 110. Further, spacers 110 may have a uniform thickness, which may prevent upper and lower tabs 100t from contacting each other through the cut-out 112, thus preventing a short-circuit between adjacent tabs 110t.

Figure 19:
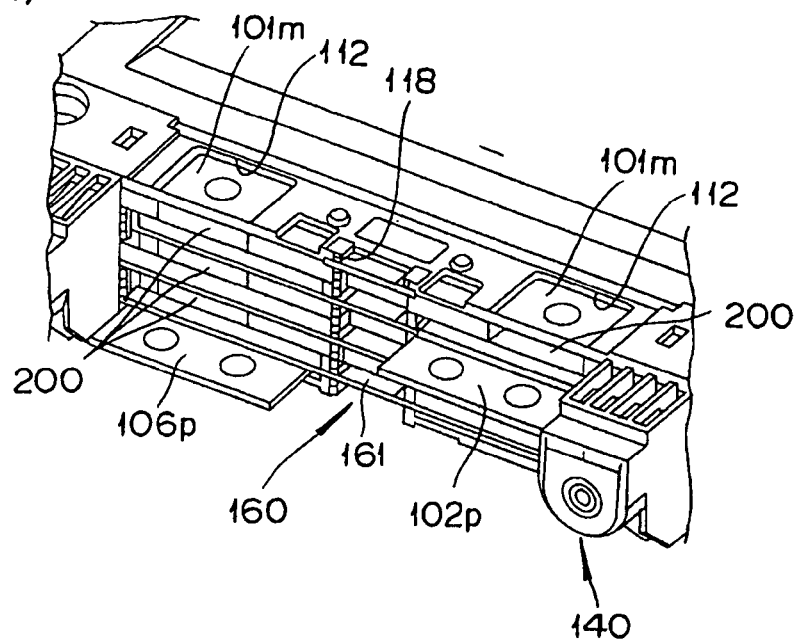
FIG. 19(A) is a perspective view showing the front side of the cell unit.
FIG. 19(B) is a perspective view showing a voltage detection connector inserted into the insulating cover installed at the front side of the cell unit.
Figure 19:
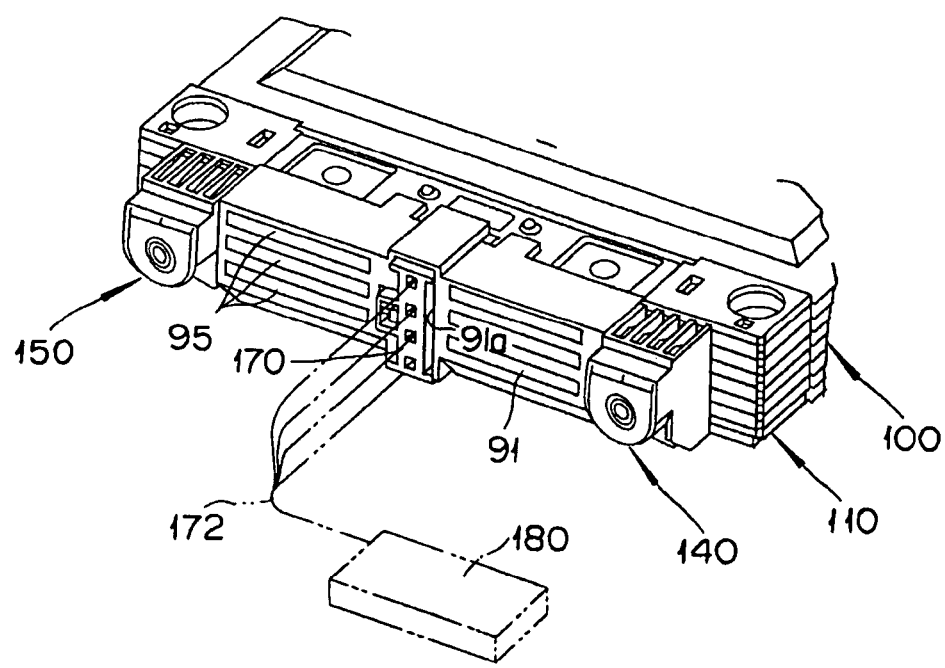
Figure 20:
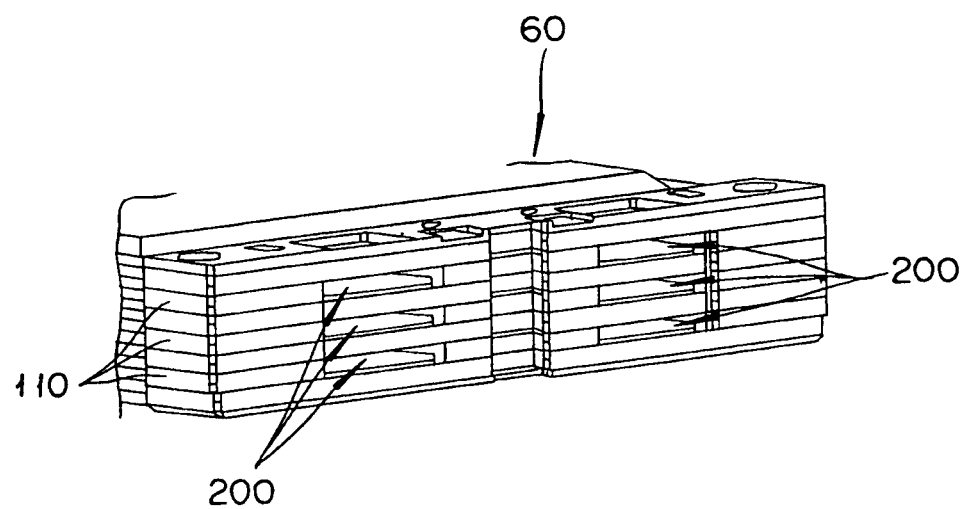
FIG. 20 is a perspective view of the back side of the cell unit.
Figure 21:
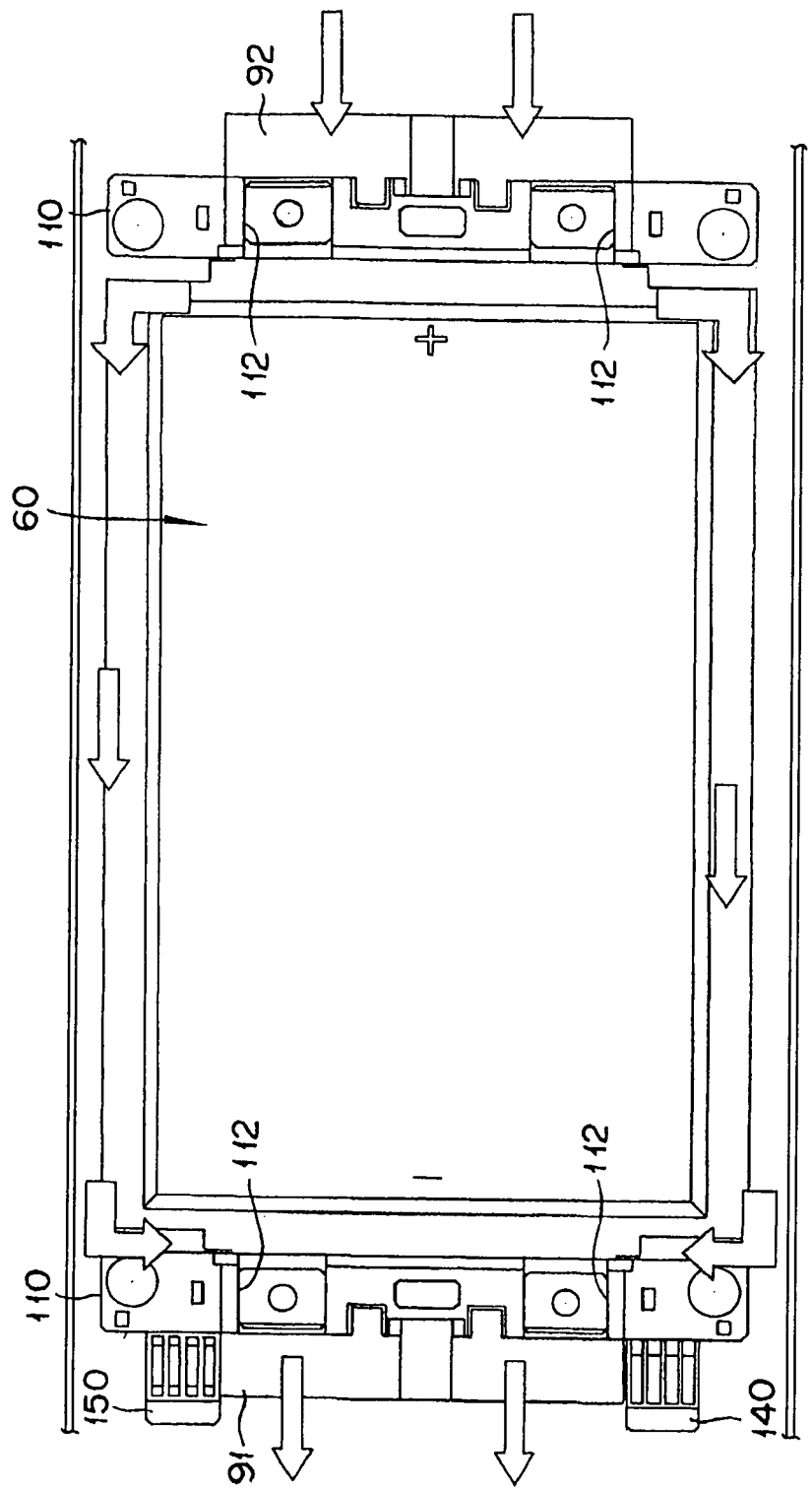
FIG. 21 is a schematic diagram showing a passageway for cooling air within the case.

Referring to FIGS. 19A-B, 20, and 21, FIG. 19A is a perspective view showing the front side of the cell unit 60; FIG. 19B is a perspective view showing that the connector 170 is inserted into the insulating cover 91 mounted on the front side of the cell unit 60; FIG. 20 is a perspective view of the back side of the cell unit 60; and FIG. 21 is a schematic diagram showing a cooling passage within the case 70.

As shown was previously shown in FIGS. 14A and 14B, FIG. 19A shows that the spacer 110 may also includes a voltage detection cut-out 118, which is different from the openings 96 formed by one or more cut-outs 112. Voltage detection cut-outs 118 are provided for exposing a portion of a proximal end of tab 100t to a voltage detection connector or a control connector 170. The portion of tab 100t exposed from cut-out 118 may be used as a voltage detecting portion 160 for detecting a voltage of the battery 100 by contact of the connector 170 to the exposed portions of tabs 100t at cutout 118. Thus, for example an external voltage detecting device 180 or controller 180 may be connected to the battery module 50 via the connector 170. As illustrated, tab 100t itself may be used as a voltage detecting portion 160, rather than using a voltage detecting terminal separated from the tab 100t. This may usefully save space and may also simplify the structural features for detecting voltage and further may facilitate the assembly of a battery module 50.

Referring to FIGS. 19A and 20, when unit cell 60 is assembled, a plurality of openings 200 or open areas 200 are formed by the cut-outs 112. The open areas 200, when surrounded by spacers 110, the tabs 100t, and adjacent stacked spacers 110, define an open space or a volume, however for convenient reference the volume space of the opening 200 may also be referred to as the open area 200 or as open areas 200. The positive-side tabs 100p and negative-side tabs 100m are exposed through the open areas 200. The openings or the volumes of the open areas 200 are defined by the exposed volume between a pair of cutouts 112 in the stacked direction. They are located in positions corresponding to those of positive-side tabs 100p and negative-side tabs 100m.

Referring to FIGS. 19A, 20, and 21, the openings referred to as open areas 200 at the front and back sides of the cell unit 60 may serve as a ventilation space. As described above, there is some space 99 between the inner wall of the case 70 and batteries 100. This space may be in fluid communication with open areas 200. Thus, as shown in FIGS. 4 and 21, for example, a cooling air introduced from open areas 200 at the back side of the cell unit 60 may flow around batteries 100 and out of open areas 200 at the front side of the cell unit 60, thus allowing the cooling air to contact tabs 100t. Thus, generated heat may be dissipated. Dew condensation may occur on the surface of tabs 100t as tabs 100t cool after tabs 100t have emitted heat by charging or discharging the batteries 100 and recharge or discharge of the batteries 100 is not performed. In addition, as the cycle continues and dew condensation is built up, the condensed dew may erode tabs 100*t*. However, when the cooling air comes in contact with tabs 100*t*, tabs 100*t* may be easily dried, thereby reducing and/or preventing dew condensation. Furthermore, because insulating covers 91 and 92 and lower case 71 are provided with through-holes 95 and 75, respectively, which are in fluid communication with open areas 200, the cooling performance of batteries 100, despite being covered by case 70, may be maintained.

FIG. 22A is a perspective view showing the connector 170 of FIG. 19B when remove or disconnected from insertion opening 91*a*. FIG. 22B is a perspective view showing the insulating cover 91. FIG. 22C is a perspective view showing the connector 170. FIG. 23A is a top view showing a main portion of the battery 100, wherein the terminal plate 161 for detecting voltage is joined to the negative-side tab 100*m*. FIG. 23B is a cross-sectional view of FIG. 23A taken along a line 23B-23B, wherein the tab 100*m* and the terminal plate 161 for detecting voltage are joined by means of punch coking. FIG. 23C is a cross-sectional view showing a main portion of the connector 170, which is inserted into the voltage detecting portion 160. FIG. 24A is a cross-sectional view showing the main portion of the spacer 110 having a concave portion 119, into which a convex portion 163 formed on the surface of the terminal plate 161 for detecting voltage is inserted by punch coking. FIG. 24B is a cross-sectional view showing that the tab 100*m* and the terminal plate 161 for detecting voltage are joined by means of a rivet 165.

Figure 22:
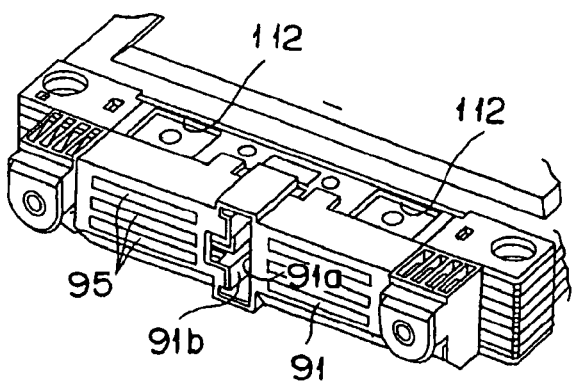
FIG. 22(A) is a perspective view showing the front side of the cell unit with the voltage detection connector of FIG. 19(B) removed.
FIG. 22(B) is a perspective view showing the insulating cover separate from the front side of the cell unit.
FIG. 22(C) is a perspective view schematically showing the voltage detection connector.
Figure 22:
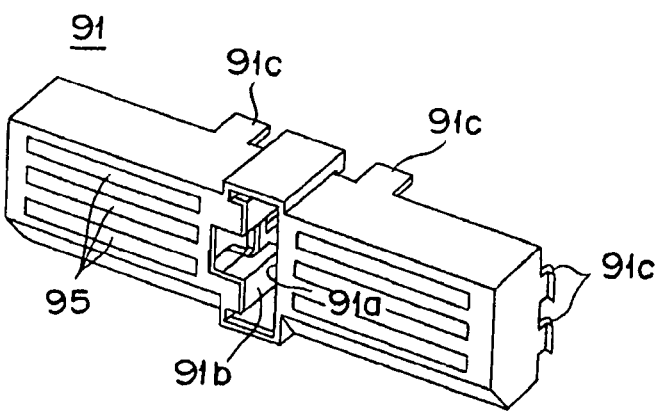
Figure 22:
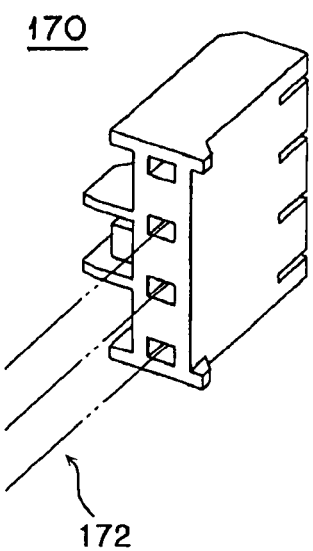
Figure 23:
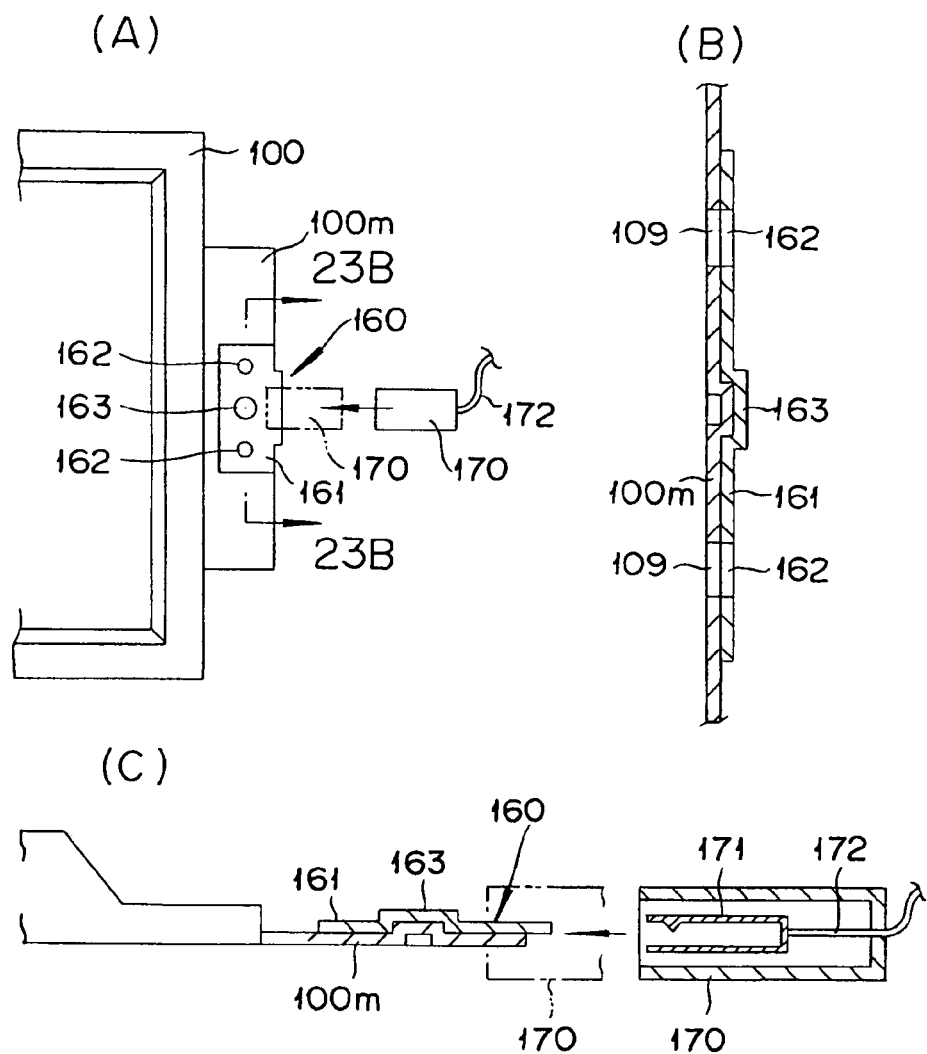
FIG. 23(A) is a top view showing a main portion of the flat battery in which the terminal board for detecting a voltage is joined to the electrode.
FIG. 23(B) is a cross-sectional view of FIG. 23(A) taken along the line 23B-23B and showing a configuration in which the electrode and the terminal board for detecting a voltage are joined together by means of punch coking.
FIG. 23(C) is a cross-sectional view of a main portion showing the connector inserted into the voltage detecting portion.
Figure 24:
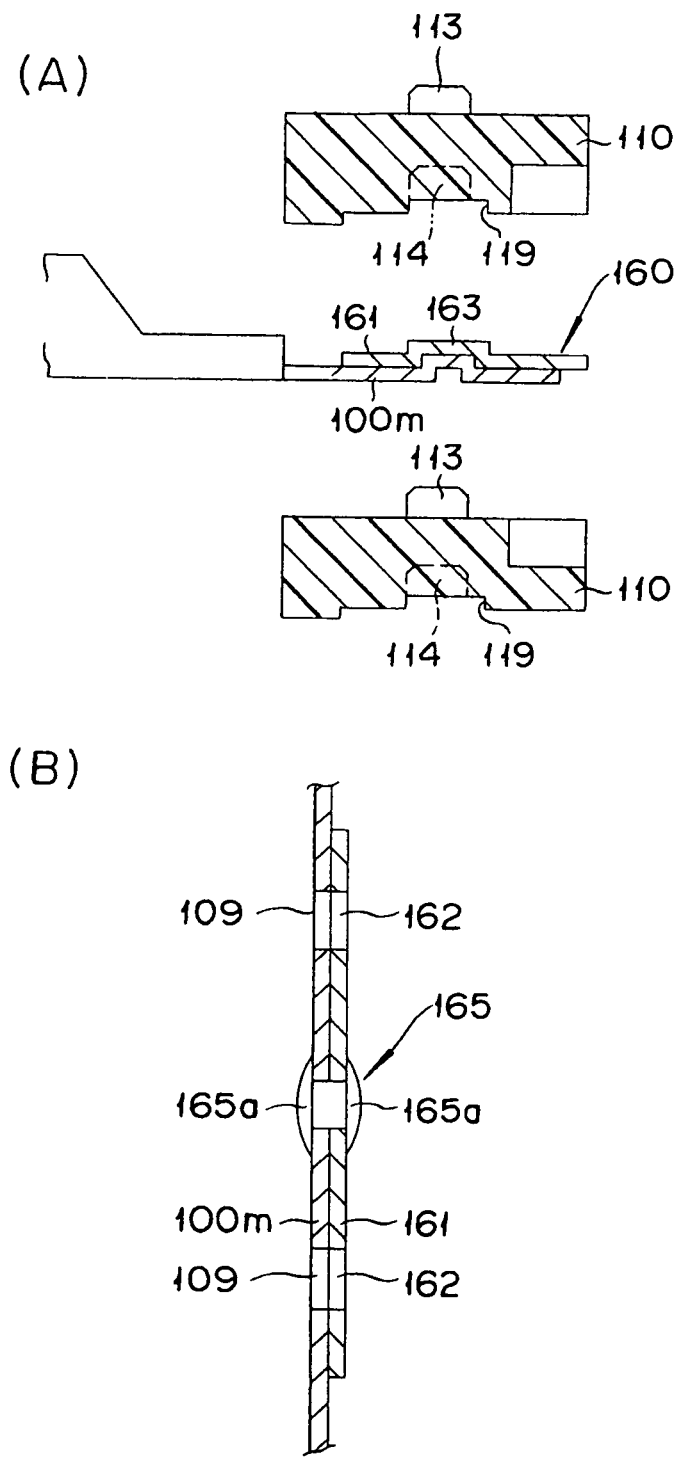
FIG. 24(A) is a cross-sectional view showing a main portion of the insulating plate having a concave portion, into which a convex portion formed on the surface of the terminal board for detecting a voltage by punch coking is inserted.
FIG. 24(B) is a cross-sectional view showing the electrode and the terminal board for detecting a voltage joined together by a rivet.

Referring to FIGS. 19, 22, and 23, connector 170 is removably mounted on/connected to the voltage detecting portion 160 through insertion opening 91*a* of insulated cover 91. As shown in FIG. 23C the connector 170 may have a connection terminal 171 that engages voltage detecting portion 160. The connector 170 may be connected to the voltage detecting device 180 via one or more lead wires 172. Thus, electrical connection of the voltage detecting portion 160 to the voltage detecting device 180 via the connector 170 and the lead wire 172 may be completed only by the insertion of the connector 170. In addition, the operation status of each battery 100 may be checked by other controllers (not shown) based on the voltage detected in the voltage detecting device 180.

A plurality of voltage detecting portions 160 of batteries 100 are arranged in a line along the stacked direction of the batteries. Further, connector 170 has a plurality of connection terminals 171 arranged at locations corresponding to each voltage detecting portion 160. As shown, four voltage detecting portions 160 are arranged at the front side, while four voltage detecting portions 160 are arranged at the back side. Once connector 170 is inserted into insertion opening 91*a*, voltage detection portion 160 and connection terminals 171 may interface, thereby allowing for electrical connection of voltage detecting portion 160 to voltage detecting device 180.

Because voltage detecting portions 160 are defined as the portion of tabs 100*t* exposed by the cutouts 118 and because tabs 100*t* are held between spacers 110, the gaps between voltage detecting portions 160 are determined by the height of the stacked spacers 110. Thus, the gaps between the voltage detecting portions 160 in the stacked direction of the batteries and the relationship among the voltage detecting portions 160 and connection terminals 171 may be maintained. Accordingly, when a plurality of voltage detecting portions 160 are aligned with a plurality of connection terminals 171, adjustment of the height of each voltage detecting portion 160 may not be necessary, allowing for ease in connecting the plurality of connection terminals 171 at one time.

The dimension of each battery 100 in a portion including the charged element or tabs 100*t* may vary in thickness (i.e., cell height). Generally, when tab 100*t* is relatively thick, the portion of tab 100*t* serving as the voltage detecting portion 160 is not usually deformed upon insertion or removal from the connector 170. However, when tab 100*t* is relatively thin, tab 100*t* may be subjected to deformation upon such insertion or removal. Thus, in accordance with one embodiment of the present disclosure, voltage detecting portion 160 may have a terminal plate 161, which may be made from a metal plate thicker than tab 100*t*, may be attached thereto to prevent deformation of tab 100*t*. Terminal plate 161 may be received by spacer 110 at a concave position (not shown) formed at the back surface of spacer 110. The strength of the voltage detecting portion 160 may be increased by the addition of terminal plate 161 in comparison to a voltage detecting portion 160 without including the terminal plate 161, thereby reducing and/or preventing deformation of voltage detecting portion 160 resulting from the insertion or removal of the connector 170. In addition, the terminal plate 161 may be attached directly to tab 100*t*; thereby saving more space as compared to the use of a terminal plate 161 separated from the tab 100*t*.

Terminal plate 161 includes a through-hole 162 through which pin 113 of spacer 110 may be inserted. The pin 113 inserted through the through-hole 162 may support the terminal plate and relieve the load applied on the terminal plate 161 and thus on tab 100*t* and the charged element, etc., upon insertion and removal of connector 170. However, one of ordinary skill in the art would recognize that depending on the relative thickness and/or strength of tab 100*t* (and the likelihood of deformation that may result from the insertion and removal of connector 170); terminal plate 161 may or may not be needed.

Referring to FIG. 17A, tab 101*p* is adjacent and place on tab 102*m*. The terminal plate 161 is mounted on tab 102*m*. To avoid contact between tab 101*p* and terminal plate 161, the tab 101*p* is provided with and/or includes a cutout portion 100*b* that corresponds in location to terminal plate 161 and is larger in size than terminal plate 161. By this construction, no gap is created by interposing the terminal plate 161 between tabs 101*p* and 102*m* and, tabs 102*m* and 101*p* may thereby be allowed to be closely disposed and in contact with to each other to achieve the desired electrical connection even though a terminal plate 161 might be attached.

As describe above, tabs 100*t* may be fixed to each other by welding such as by ultrasonic welding. As shown in FIG. 17, tabs 102*m* and 101*p* may be fixed to each other by welding such as by ultrasonic welding in cutout region 112. Furthermore, tab 101*m* and bus bar 151 of the output terminal 150 (shown in FIG. 15) may also be fixed to each other by welding such as by ultrasonic welding in cutout region 112. The tabs 102*p*, 103*m*, 106*p* and 107*m* extending beyond spacers 110 may be fixed to each other by welding such as by ultrasonic welding (shown in FIGS. 16 and 19A).

One of ordinary skill in the art would recognize that tabs 100*t* and terminal plate 161 may also be fixed by ultrasonic welding. However, if tabs 100*t* and the terminal plate 161 are fixed by ultrasonic welding and tabs 100*t* are then fixed to each other by ultrasonic welding, it is possible that the welded portion between tabs 100*t* and terminal plate 161 may be subjected to vibrations resulting from ultrasonic welding, which could potentially result in separation of the welded portion and degradation of weld strength. Therefore, when tabs 100*t* are fixed to each other by ultrasonic welding, it may be useful to fix tabs 100*t* with terminal plate 161 by either punch coking or riveting 165 to maintain weld strength and a desired level of quality. Furthermore, upon insertion and removal of connector 170, terminal plate 161 may be subjected to a thrust force due to friction and clipping force between connection terminal 171 and terminal plate 161.

Such a thrust force may be withstood and relieved by the shear strength of punch coking or rivet 165, thus reducing or preventing the separation of the tab 100t and the terminal plate 161.

Referring to FIG. 23, according to one embodiment of the present disclosure, tabs 100m and terminal plates 161 are joined by means of punch coking. That is, aligned convex and concave portions 163 are formed on the top surface of terminal plate 161 and bottom surface of terminal plate 161 or tab 100m, respectively. As shown in FIGS. 23B and 23C, when connector 170 and connection terminal 171 are inserted into opening 91a adjacent terminal plate 161 and tabs 100m, the location to which the connector 170 is inserted may be controlled, as shown in FIGS. 23A and 23C. By performing punch coking, the plane across the engaged concave portion 163, by which the tab 100m and the terminal plate 161 are press-fit, creates a step that is perpendicular to the direction of the thrust resulting from the insertion and removal of connector 170. Accordingly, despite the thrust, the fixed portion between tab 100m and terminal plate 161 may withstand separation.

Referring to FIG. 24A, spacer 110 has a concave portion 119 into which a convex portion 163 formed on the surface of the terminal plate 161 by punch coking may be inserted. Concave portion 119 of spacer 110 and convex portion 163 of the surface of the terminal plate 161 are coupled when tab 100m is received by spacer 110. If terminal plate 161 is subjected to vibration from connector 170, spacer 110 may attenuate such vibration and protect tab 100m from the same. Therefore, concentration of stress at the joint portion welding between the tabs may be reduced and/or prevented, thereby improving the durability of tabs 100t as well as the reliability of battery module 50. Furthermore, because spacer 110 may resist the thrust applied to the terminal plate 161, the thrust applied to tab 100m may be reduced, thereby improving the durability of tab 100m.

As described above, the pin 113 is mounted on spacer 110 and passes through through-holes 109 and 162 formed in tab 100m and terminal plate 161. Pin 112 may then be inserted into the concave portion 114 of the upper spacer 110. FIG. 24B illustrates an embodiment in which tab 100m and terminal plate 161 are joined by the rivet 165. Rivet 165 includes a head 165a that protrudes both from the top and bottom surface of terminal plate 161, thereby forming a convex shape. Similarly, when joining tab 100m and terminal plate 161 together by using the rivet 165, spacer 110 preferably has a concave portion 119, into which rivet head 165a is inserted.

The stacked state of batteries 100 and/or spacers 110 in cell unit 60 are shown in FIGS. 11 and 12. Referring to FIG. 12, the second battery 102 and the fifth battery 105 may use the same type of battery and may be disposed in an opposite direction without being turned upside down relative to each other. Similarly, the third battery 103 and the sixth battery 106, and the fourth battery 104 and seventh batter 107 may also each use the same types of battery. Accordingly, although the cell unit 60 includes eight batteries 101 to 108, only five types of differently shaped batteries are used. Reducing the types of batteries 100 may allow for lowered costs of manufacturing battery 100.

The shape of tab 100t may vary and may be determined by considering that tabs 100t in and between the sub-assemblies 81, 82 and 83 should be easily joined. Specifically, tabs 100t can be shaped in two different configurations. One configuration provides an elongated tab 100t along the longitudinal direction so that its proximal end extends beyond spacer 110. In a different configuration, the proximal end is not elongated beyond spacer 110. As shown in FIG. 12, the first or elongated configuration includes positive-side tab 102p, positive-side tab 103p, negative-side tab 103m, negative-side tab 104m, positive-side tab 105p, positive-side tab 106p, negative-side tab 106m, and negative-side tab 107m. The latter configuration includes the tabs other than those explained above, i.e., the positive-side tab 101p, negative-side tab 101m, negative-side tab 102m, positive-side tab 104p, negative-side tab 105m, positive-side tab 107p, positive-side tab 108p, and negative-side tab 108m.

The terminal plate 161 is attached to the negative-side tabs 100m of each battery 100. The positive-side tabs 101p, 104p, and 107p have cut-outs 100b for receiving the terminal plate 161 on the negative-side tab 101m in which the terminal plate 161 is installed (as shown in FIG. 13A).

Referring to FIG. 12, the electrical connection of the battery 100 will be described. In FIG. 12, the electrically connected tabs 100t are connected to each other as shown by a double-dashed connection line.

The "black rectangles," which are provided adjacent to certain connection lines, indicate the tabs 100t that are joined to each other by ultrasonic welding in the cutout region 112 in the first to third sub-assemblies 81, 82, and 83. The "black circles," which are provided adjacent to other connection lines, indicate the tabs 100t that extend outward from the battery beyond spacers 110 and that are joined to each other exterior to spacer 110 by ultrasonic welding within the first and third sub-assemblies 81 and 83. Furthermore, the "white circles," which are provided adjacent to certain other connection lines, indicate the tabs 100t that extend beyond spacer 110 and that are joined to each other exterior to spacer 110 by ultrasonic welding when each sub-assembly 81, 82, and 83 is assembled and then connected to each other.

When the first sub-assembly 81 is assembled, positive-side tab 101p and negative-side tab 102m are joined within cut-out region 112. Further, positive-side tab 102p and negative-side tab 103m are joined exterior to spacer 110. Negative-side tab 101m and bus bar 151 of the negative-side output terminal 150 are also joined within cut-out region 112 (shown in FIG. 16).

For assembly of second assembly 82, positive-side tab 104p and negative-side tab 105m are joined within cutout region 112. In addition, when the third assembly 83 is assembled, positive-side tab 107p and negative-side tab 108m are joined within cut-out region 112, and positive-side tab 106p and negative-side tab 107m are joined exterior to spacer 110. Positive-side tab 108p and the bus bar 141 of the positive-side output terminal 140 are joined within cut-out region 112.

Positive-side tab 103p and negative-side tab 104m are joined to each other exterior to spacer 110 when each sub-assembly 81, 82, 83 is assembled and the first sub-assembly 81 and the second assembly 82 are then connected. Positive-side tab 105p and negative-side tab 106m are joined exterior to spacer 110 when the second sub-assembly 82 and the third assembly 83 are connected. Thus, tabs 100p and 100m are electrically connected to each other in order to connect batteries 101 to 108 in series. Further, the positive-side output terminal 140 and the negative-side output terminal 150 are electrically connected to the eighth and first battery 108 and 101, respectively, located at each end along the stacked direction.

At the front side (to the right in FIG. 12), four voltage detecting portions 160 (not shown in FIG. 12 yet corresponding in location to terminal plates 161) may be arranged along a line in the stacked direction of the battery at terminal plates 161 attached to negative-side tabs 101m, 103m, 105m and 107m of the first, third, fifth and seventh batteries 101, 103, 105 and 107, respectively. At the back side (to the left in FIG. 12), four voltage detecting portions 160 (not shown) may be arranged along a line in the stacked direction of the battery at terminal plates 161 attached to negative-side tabs 102m, 104m, 106m and 108m of the second, fourth, sixth and eighth batteries 102, 104, 106 and 108.

For example, the voltage of the first battery 101 may be measured by detecting a voltage between voltage detecting portion 160 at negative-side tab 101m and voltage detecting portion 160 at negative-side tab 102m. The voltage of the second battery 102 may be measured by detecting a voltage between voltage detecting portion 160 at negative-side 102m and voltage detecting portion 160 at negative-side tab 103m. The voltage of the third to eighth batteries 103 to 108 may be similarly measured.

Referring to FIG. 11, the stacking of batteries 100 and/or spacers 110 in the cell unit is shown. At the front side (to the right in FIG. 11), the first and the second spacers 121 and 122 are configured to receive and retain the negative-side tab 101m and bus bar 151 of the negative-side output terminal 150. Similarly, the second and third spacers 122 and 123 are configured to receive and retain positive-side tab 102p; the third and fourth spacers 123 and 124 are configured to receive and retain negative-side tab 103m; the fifth and sixth spacers 125 and 126 receive and retain positive-side tab 104p and negative-side tab 105m; the sixth and seventh spacers 126 and 127 receive and retain positive-side tab 106p; the seventh and eighth spacers 127 and 128 are configured to receive and retain negative-side tab 107m; the eighth and ninth spacers 128 and 129 are also configured to receive and retain positive-side tab 108p and bus bar 141 of the positive-side output terminal 140.

At the back side (to the left in FIG. 11), the tenth spacer 130 is stacked upon the eleventh spacer 131. The eleventh and twelfth spacers 131 and 132 are configured to receive and retain positive-side tab 101p and negative-side tab 102m; the twelfth and thirteenth spacers 132 and 133 receive and retain positive-side tab 103p; the thirteenth and fourteenth spacers 133 and 134 are configured to receive and retain negative-side tab 104m; the fourteenth and fifteenth spacers 134 and 135 receive and retain positive-side tab 105p; the fifteenth and sixteenth spacers 135 and 136 are configured to receive and retain negative-side tab 106m; similarly, the seventeenth and eighteenth spacers 137 and 138 are configured to receive and retain positive-side tab 107p and negative-side tab 108m.

The spacers 110 may have various shapes and configurations, according to various alternative embodiments. For example, one or more of the spacers may be disposed in opposite directions or may be constructed without being turned upside down at the front and back sides. In addition, identical spacers are included (among the nine spacers 121 to 129) at the front side, whereas the other identical spacers are included (among the nine spacers 130 to 138) at the back side. The cell unit 60 includes eighteen spacers 121 to 138. As shown in FIG. 11, however, eight types of spacers having different shapes, identified as spacer type No. 8 through No. 15, may be used. Spacer types Nos. 8-15 may be used on the first to eighteenth spacers 121-138 as shown below:

| Back side | Front side |
| --- | --- |
| Tenth spacer 130: #9 | First spacer 121: #9 |
| Eleventh spacer 131: #12 | Second spacer 122: #13 |
| Twelfth spacer 132: #11 | Third spacer 123: #10 |
| Thirteenth spacer 133: #10 | Fourth spacer 124: #11 |
| Fourteenth spacer 134: #11 | Fifth spacer 125: #12 |

-continued

| Back side | Front side |
| --- | --- |
| Fifteenth spacer 135: #10 | Sixth spacer 126: #11 |
| Sixteenth spacer 136: #11 | Seventh spacer 127: #10 |
| Seventeenth spacer 137: #15 | Eighth spacer 128: #9 |
| Eighteenth spacer 138: #14 | Ninth spacer 129: #8 |

The following description describes the steps for assembling battery module 50 according to one embodiment of the present disclosure.

Figure 30:
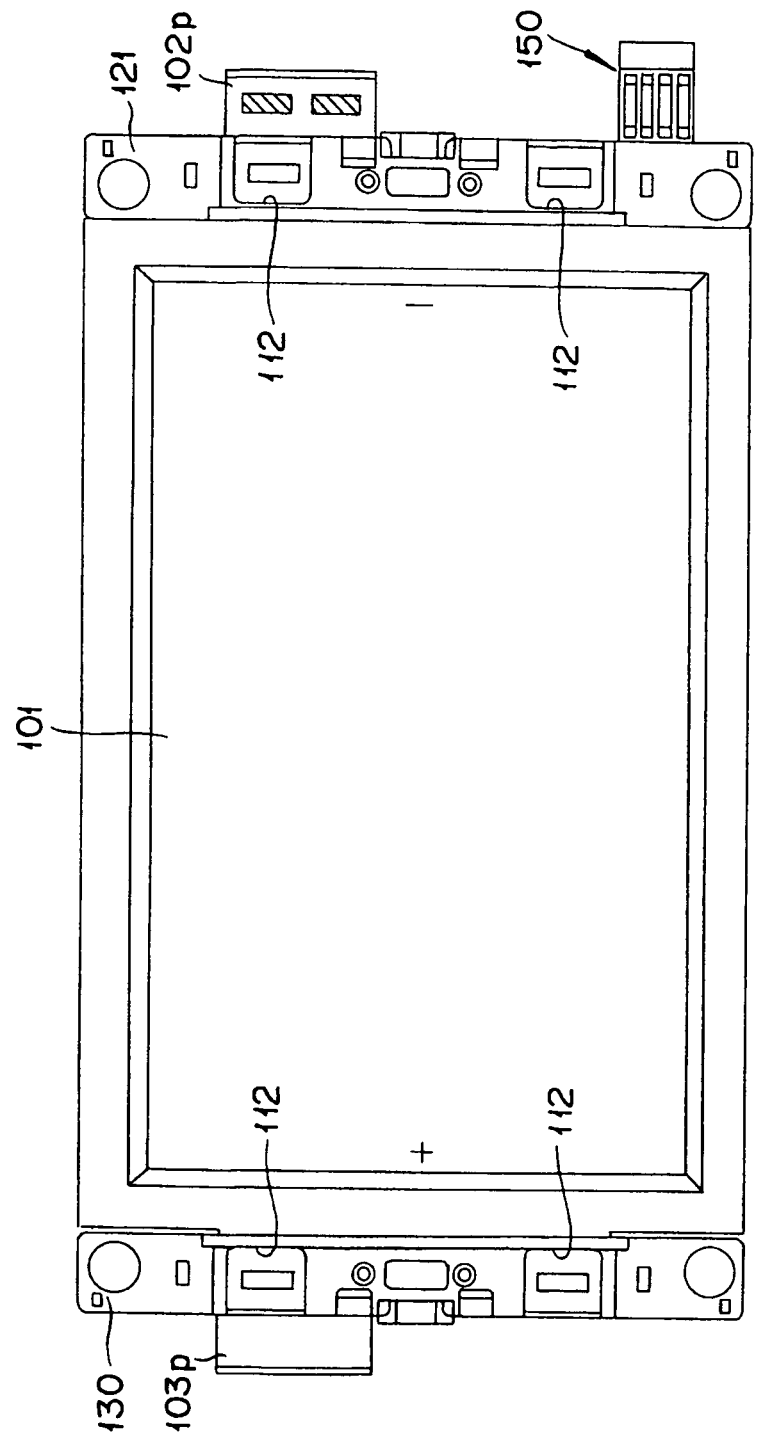
FIG. 30 is a plan view illustrating the assembling of the first sub-assembly subsequent to FIG. 29.
Figure 31:
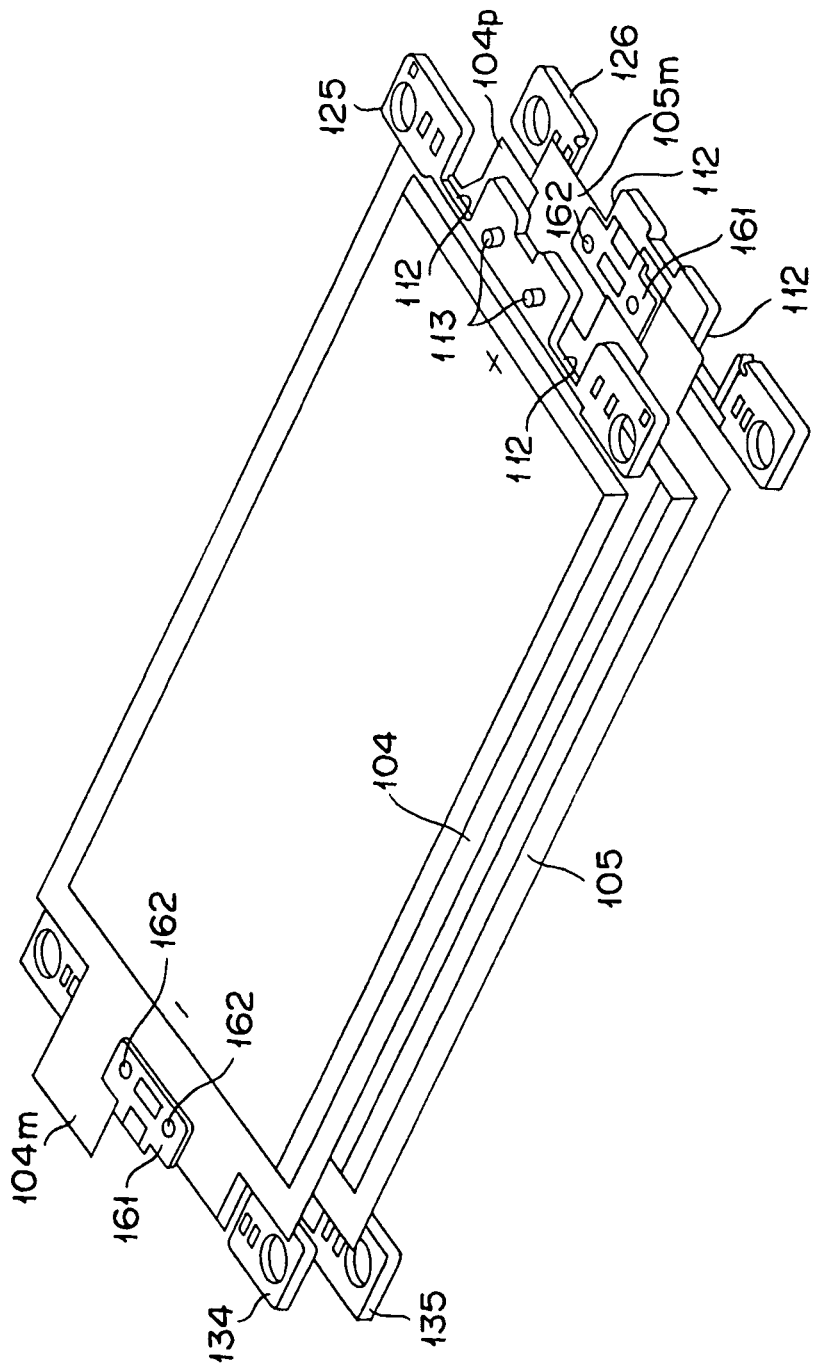
FIG. 31 is a perspective partial assembly view illustrating part of a second sub-assembly.
Figure 32:
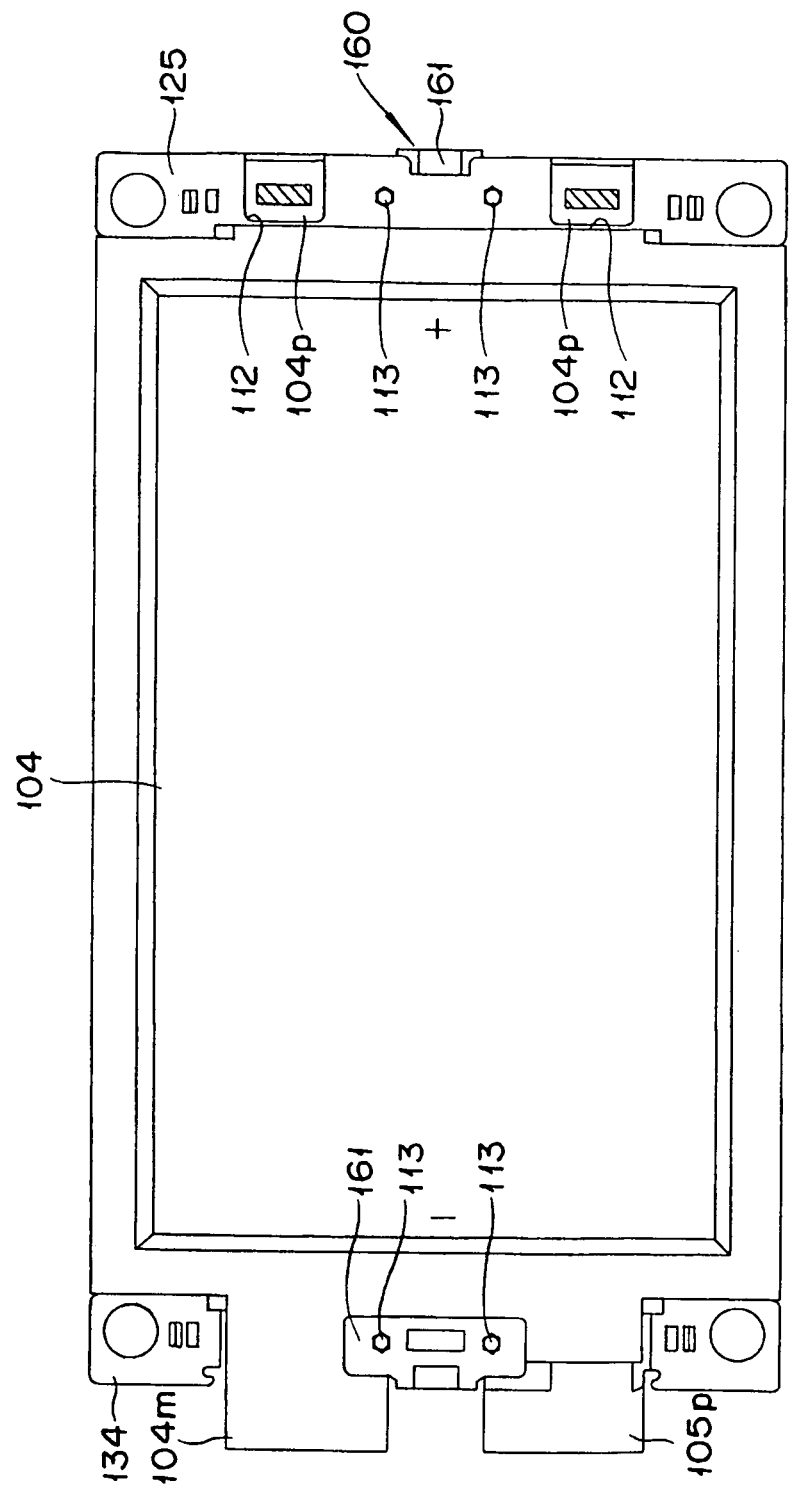
FIG. 32 is a plan view illustrating the assembling of the second sub-assembly subsequent to FIG. 31.

FIGS. 31 to 32 show the steps of assembling the second sub-assembly 82. FIGS. 33 to 38 show the steps of assembling the third sub-assembly 83. In FIGS. 26, 28, 30, 32, 34, 36, and 38, the locations of ultrasonic welding treatment are emphasized via hatching.

Assembly of the First Sub-Assembly 81

Figure 25:
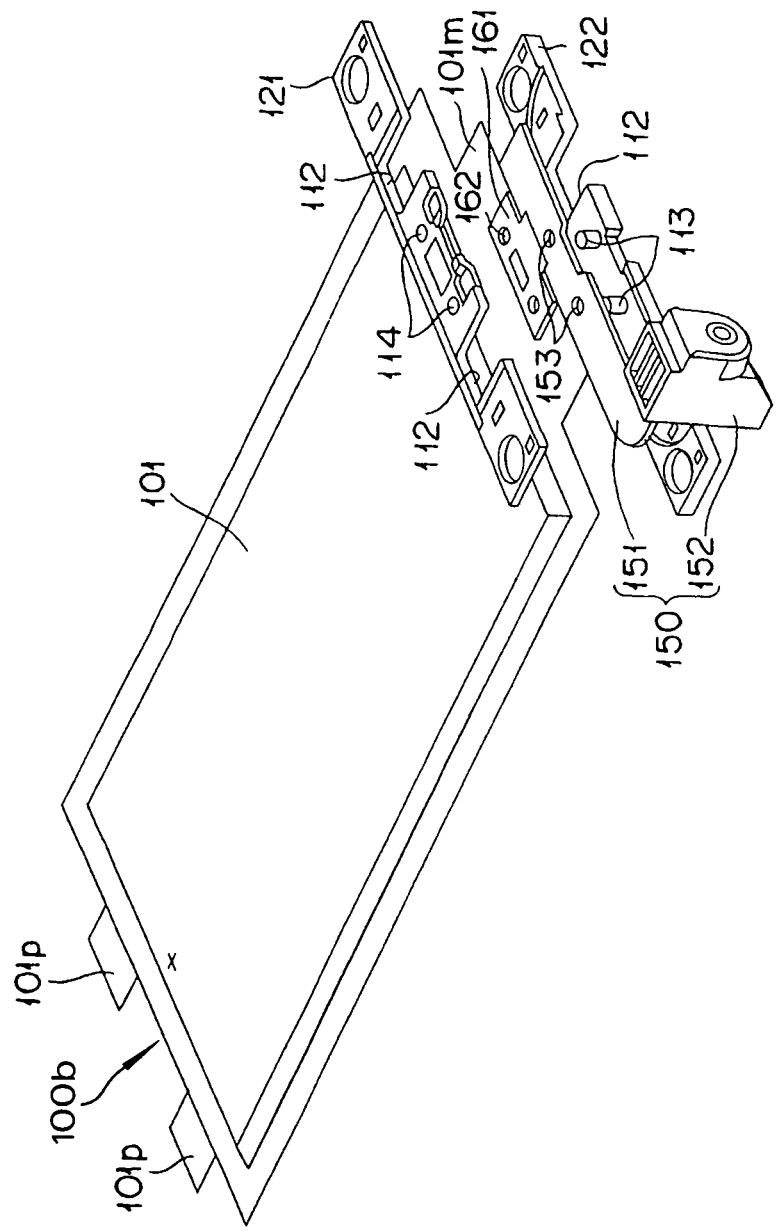
FIG. 25 is a perspective partial assembly view illustrating part of the assembling of a first sub-assembly.

Referring to FIGS. 25 to 30, assembly the first sub-assembly 81 is illustrated. As shown in FIG. 25, at the front side, negative-side tab 101m and bus bar 151 of the negative-side output terminal 150 are received and aligned by the first and second spacers 121 and 122. Further, a portion of negative-side tab 101m and a portion of negative-side output terminal 150 are received and maintained within cut-out region 112 by the first and second spacers 121 and 122.

Figure 26:
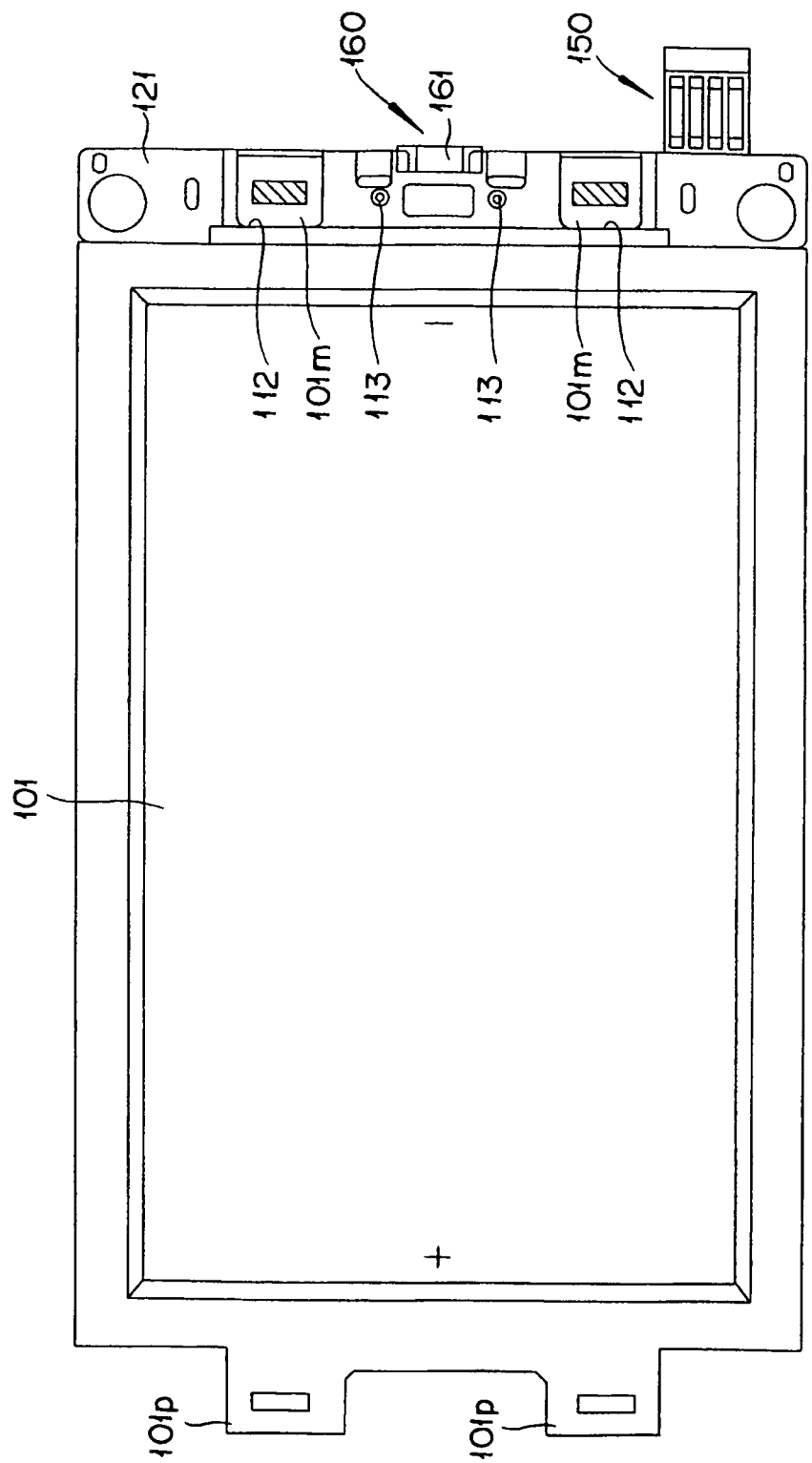
FIG. 26 is a plan view illustrating the assembling of the first sub-assembly subsequent to FIG. 25.

The pin 113 of the second spacer 122 is inserted through through-holes 153, 109 and 162 of bus bar 151, negative-side tab 101m, and terminal board 161, and into concave portion 114 of the first spacer 121. As shown in FIG. 26, the negative-side tab 101m and the bus bar 151 may be joined together via ultrasonic welding treatment, thus electrically connecting negative-side output terminal 150 to the first battery 101.

Figure 27:
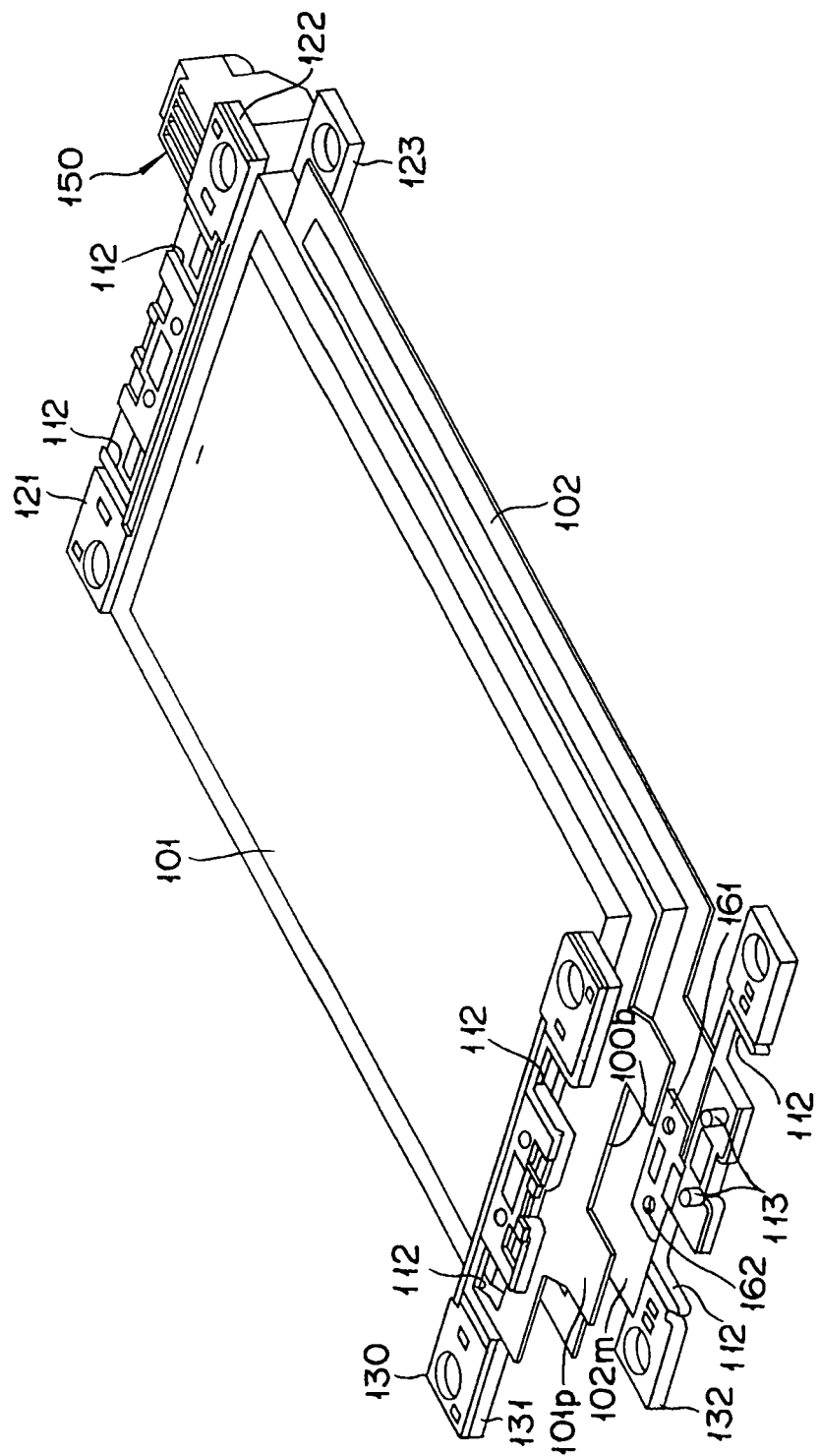
FIG. 27 is a perspective partial assembly view illustrating part of the first sub-assembly subsequent to FIG. 26.

As shown in FIG. 27, at the back side, the tenth spacer 130 is stacked upon the eleventh spacer 131. Positive-side tab 101p and negative-side tab 102m are received and aligned by the eleventh and twelfth spacers 131 and 132. Further, portions of each of tabs 101p and 102m are received and maintained within cut-out region 112 of the eleventh and twelfth spacers 131 and 132.

Figure 28:
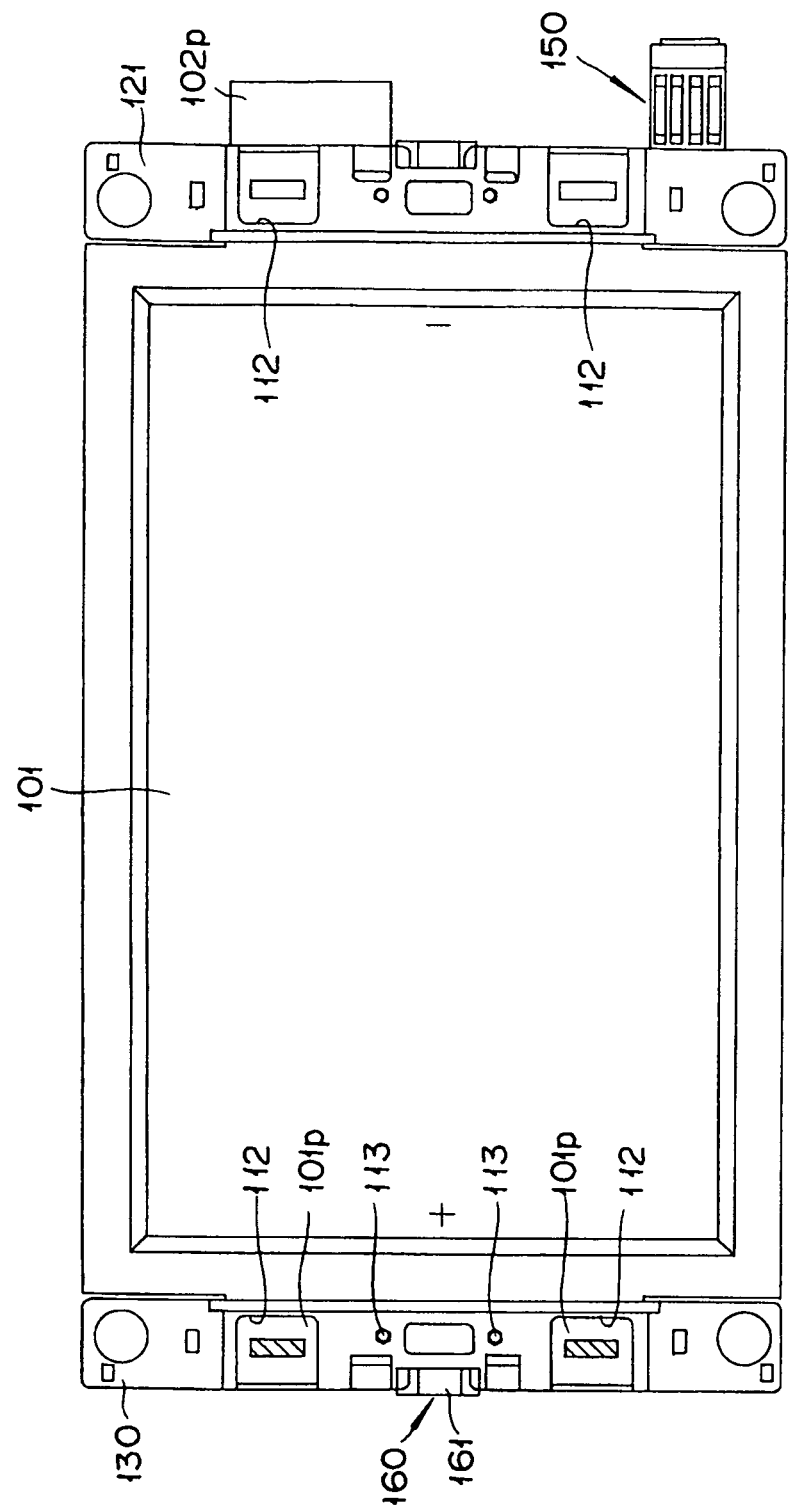
FIG. 28 is a plan view illustrating the assembling of the first sub-assembly subsequent to FIG. 27.

The pin 113 of the twelfth spacer 132 is inserted through through-holes 109 and 162 of tab 102m and the plate 161 and into the concave portion 114 of the eleventh spacer 131 to tighten tabs 101p and 102m to each other. As shown, tab 101p has cutout 100b corresponding to terminal plate 161. The first battery 101 and the second battery 102 may bonded to each other by using a double-sided tape. As shown in FIG. 28, positive-side tab 101p and negative-side tab 102m may be joined together in cut-out region 112 via ultrasonic welding treatment, thus connecting the first battery 101 and the second battery 102 in series. In addition, at the front side, the positive-side tab 102p of the second battery 102 is received and retained by the second and third spacers 122 and 123. A portion of the tab 102p extends beyond spacers 122 and 123 (shown in FIGS. 28 and 29). The pin 113 of the third spacer 123 is inserted through through-holes 109 of positive-side tab 102p and into the concave portion 114 of the second spacer 122.

Figure 29:
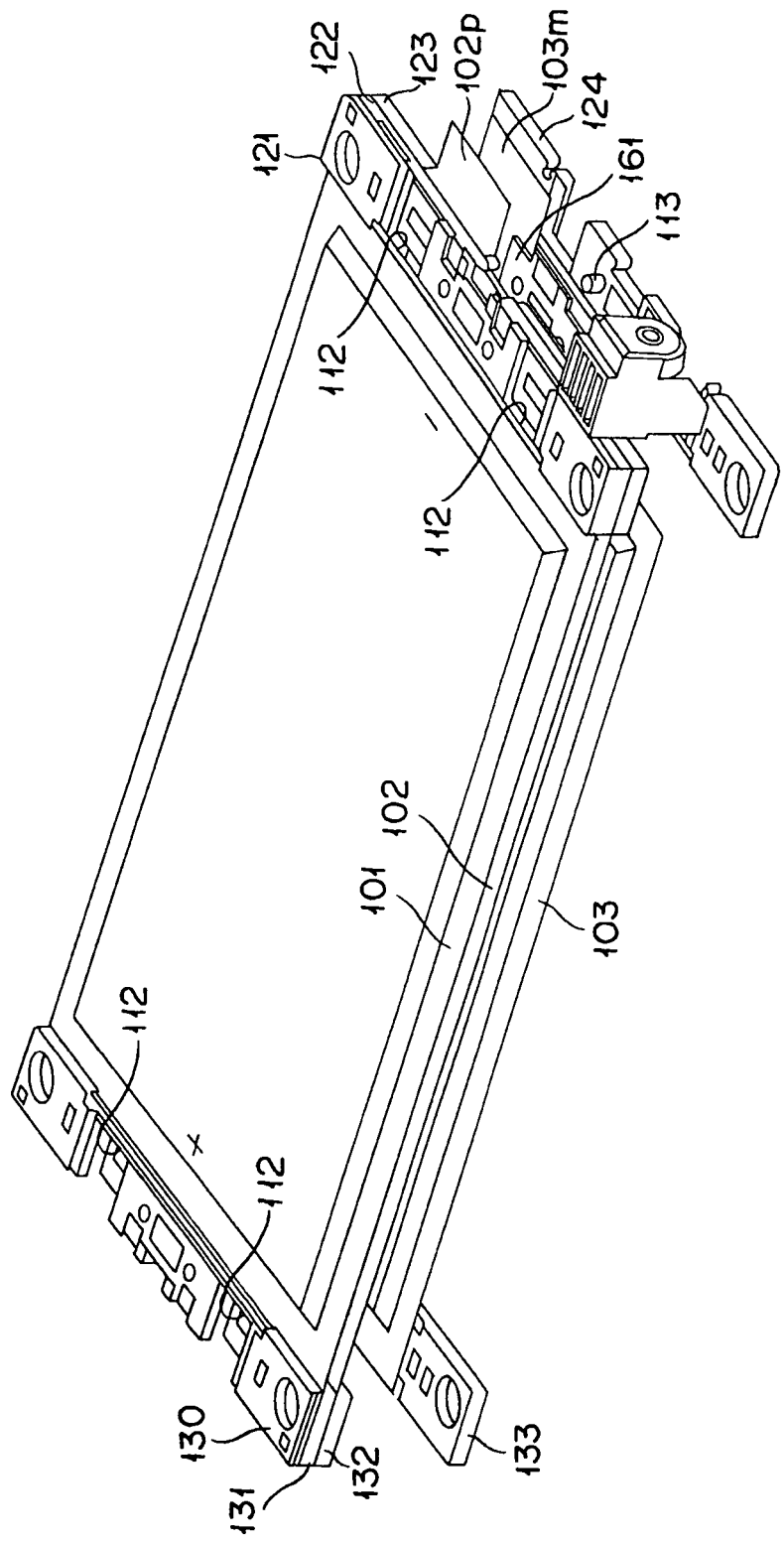
FIG. 29 is a perspective partial assembly view illustrating part of the first sub-assembly subsequent to FIG. 28.

As shown in FIG. 29, at the front side, negative-side tab 103m is received and maintained by the third and fourth spacers 123 and 124 with a portion of tab 103m extending beyond spacers 123 and 124. The pin 113 of the fourth spacer 124 is inserted through through-holes 109 and 162 of tab 103m and terminal plate 161 and into the concave portion 114 of the third spacer 123. The second battery 102 and the third battery 103 may be bonded together by using a double-sided tape. As shown in FIG. 30, negative-side tab 103m and positive-side tabs 102p, both extending beyond spacers 121 to 124, are joined to each other exterior to spacers 121 to 124 via ultrasonic welding treatment, thus connecting the second battery 102 and the third battery 103 in series. In addition, at the back side, positive-side tab 103p is received and retained by the twelfth and thirteenth spacers 132 and 133 with a portion of the tab 103p extending beyond spacers 132 and 133 (shown in FIGS. 29 and 30). The pin 113 of the thirteenth spacer 133 is inserted through through-holes 109 of positive-side tab 103p and into the concave portion 114 of the twelfth spacer 132. By implementing the above, the assembly of the first sub-assembly 81 may be completed.

Assembly of the Second Sub-Assembly 82

As shown in FIG. 31, at the front side, positive-side tab 104p and negative-side tab 105m are received and aligned by the fifth and sixth spacers 125 and 126. Further, portions of tabs 104p and 105m are received and retained within the cut-out region 112 by the fifth and sixth spacers 125 and 126. Tab 104p has a cutout portion 100b corresponding to terminal board 161. The pin 113 of the sixth spacer 126 is inserted through through-holes 109 and 162 of tab 105m and terminal board 161 and into the concave portion 114 of the fifth spacer 125, thus tightening tabs 104p and 105m to each other. The fourth battery 104 and fifth battery 105 may be bonded together by using a double-sided tape. As shown in FIG. 32, the positive-side tabs 104p and negative-side tab 105m are joined together in cutout region 112 via ultrasonic welding treatment, thus connecting the fourth battery 104 and fifth battery 105 in series. In addition, at the back side, positive-side tab 105p is received by the fourteenth and fifteenth spacers 134 and 135. A portion of the tab 105p extends beyond spacers 134 and 135 (shown in FIGS. 31 and 32). The pin 113 of the fourteenth spacer 134 is inserted through through-holes 109 and 162 of tab 104m and terminal board 161. By implementing the above, the assembly of the second sub-assembly 82 may be completed.

Assembly of the Third Sub-Assembly 83

Figure 33:
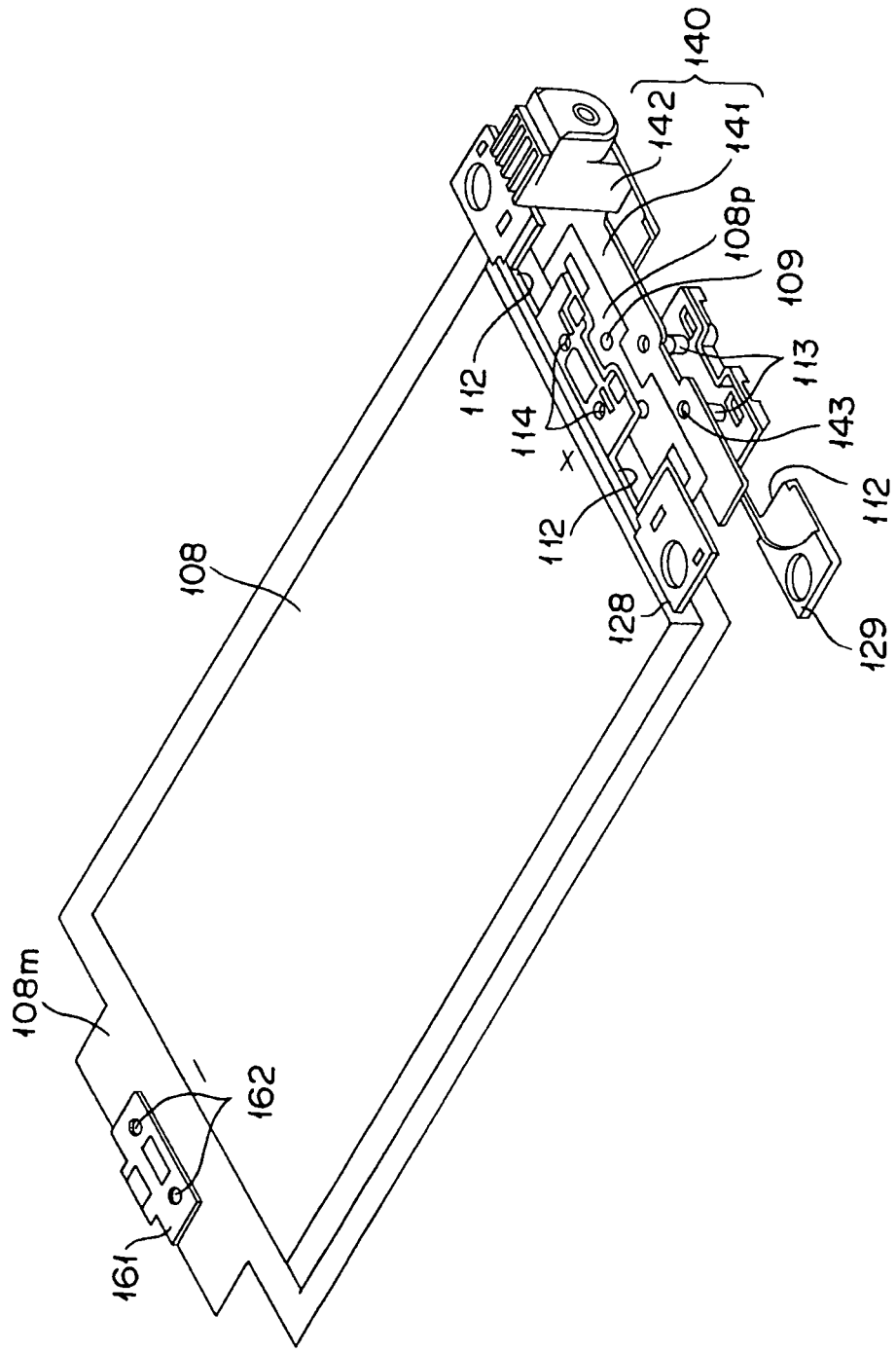
FIG. 33 is a perspective partial assembly view illustrating part of a third sub-assembly.
Figure 34:
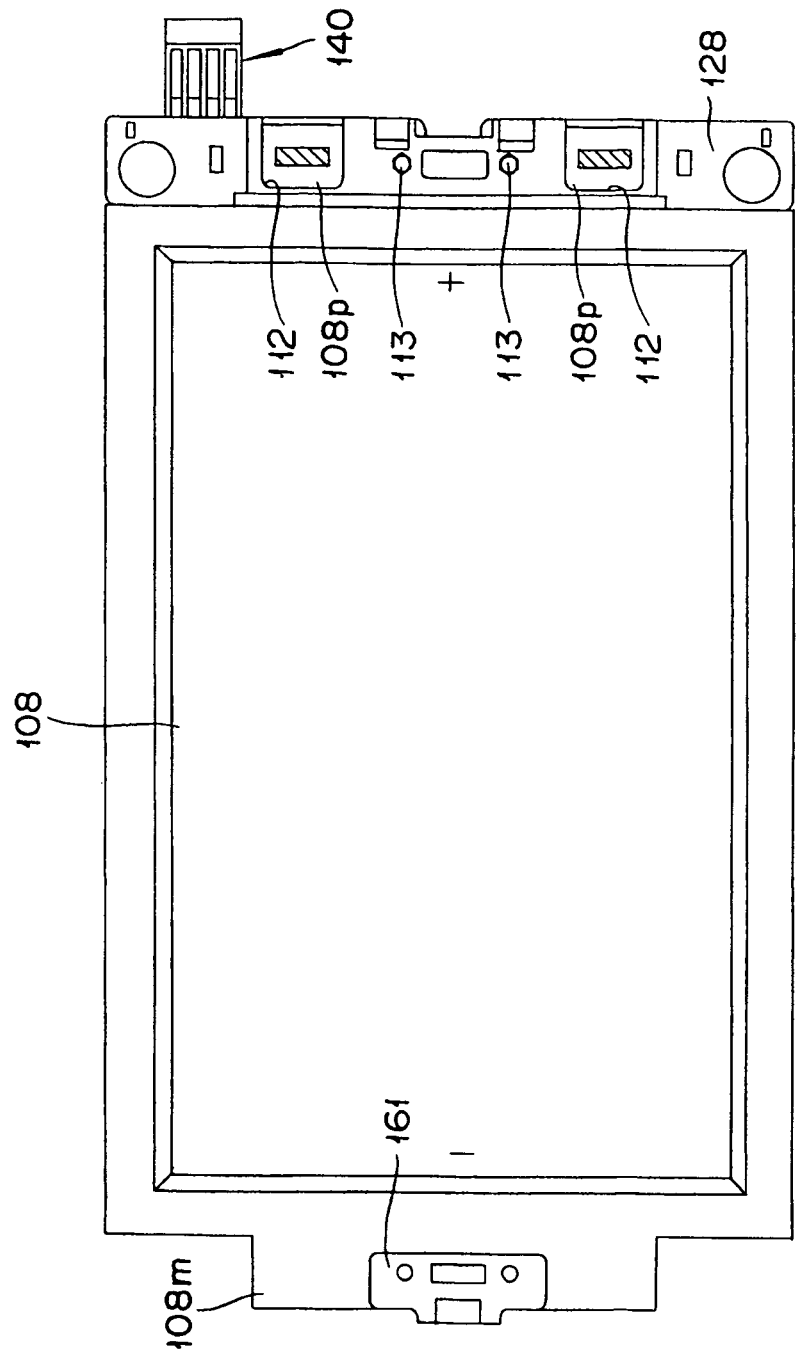
FIG. 34 is a plan view illustrating the assembling of the third sub-assembly subsequent to FIG. 33.

As shown in FIG. 33, at the front side, the positive-side of the tab 108p of the eighth battery 108 and the bus bar 141 of the positive-side output terminal 140 are received and aligned by the eighth and ninth spacers 128 and 129. Further, a portion of the tab 108p and a portion of the positive-side of the output terminal 140 are received and retained in the cutout region 1112 by the eighth and ninth spacers 128 and 129. The pin 113 of the ninth spacer 129 is inserted through the through-holes 143 and 109 of the bus bar 141 and tab 108p and into the concave portion 114 of the eighth spacer 128. As shown in FIG. 34, positive-side tab 108p and bus bar 141 are joined together in the cutout region 112 via ultrasonic welding treatment, thus electrically connecting the positive-side output terminal 140 to the eighth battery 108.

Figure 35:
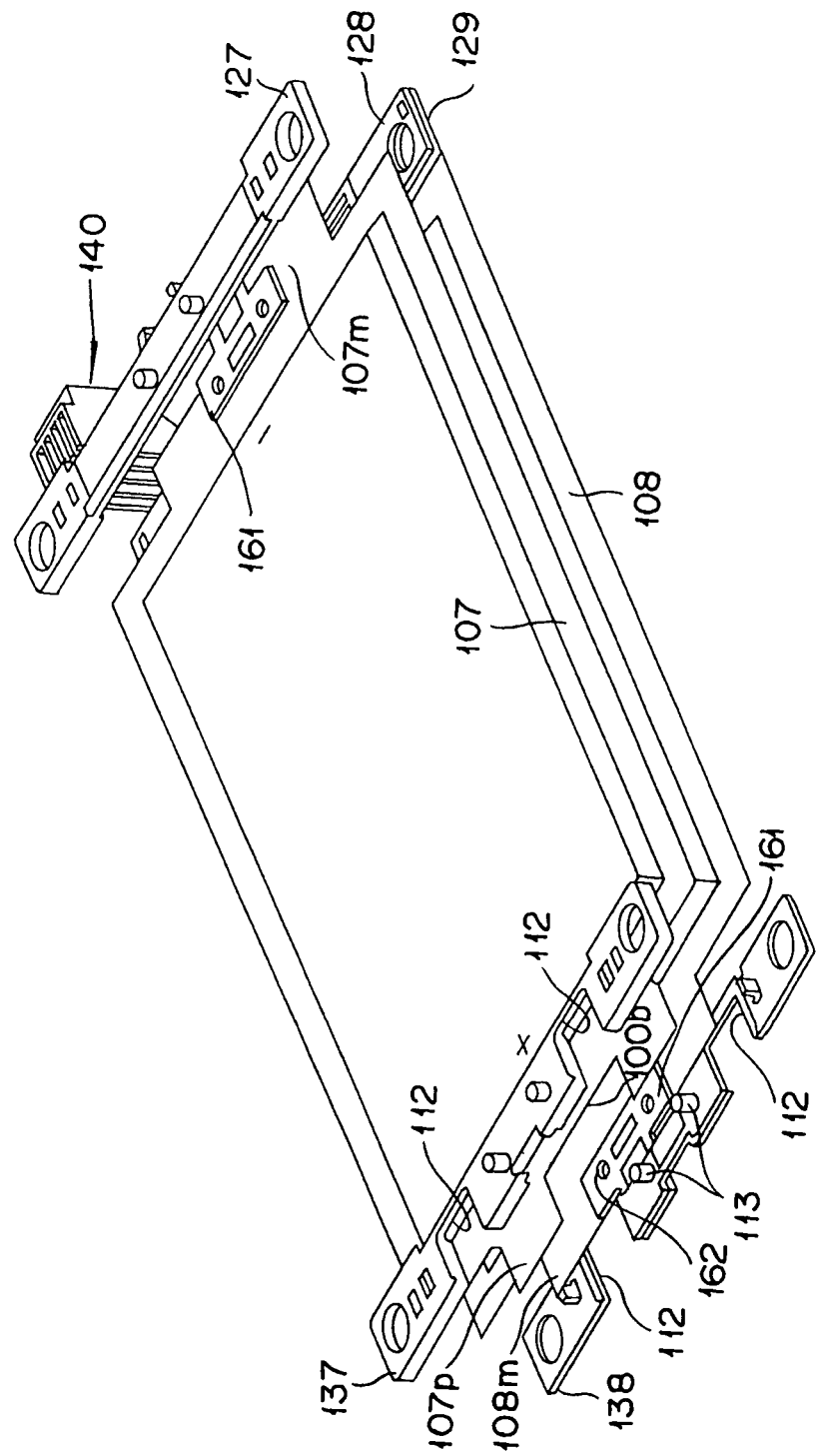
FIG. 35 is a perspective partial assembly view illustrating part of the third sub-assembly subsequent to FIG. 34.
Figure 36:
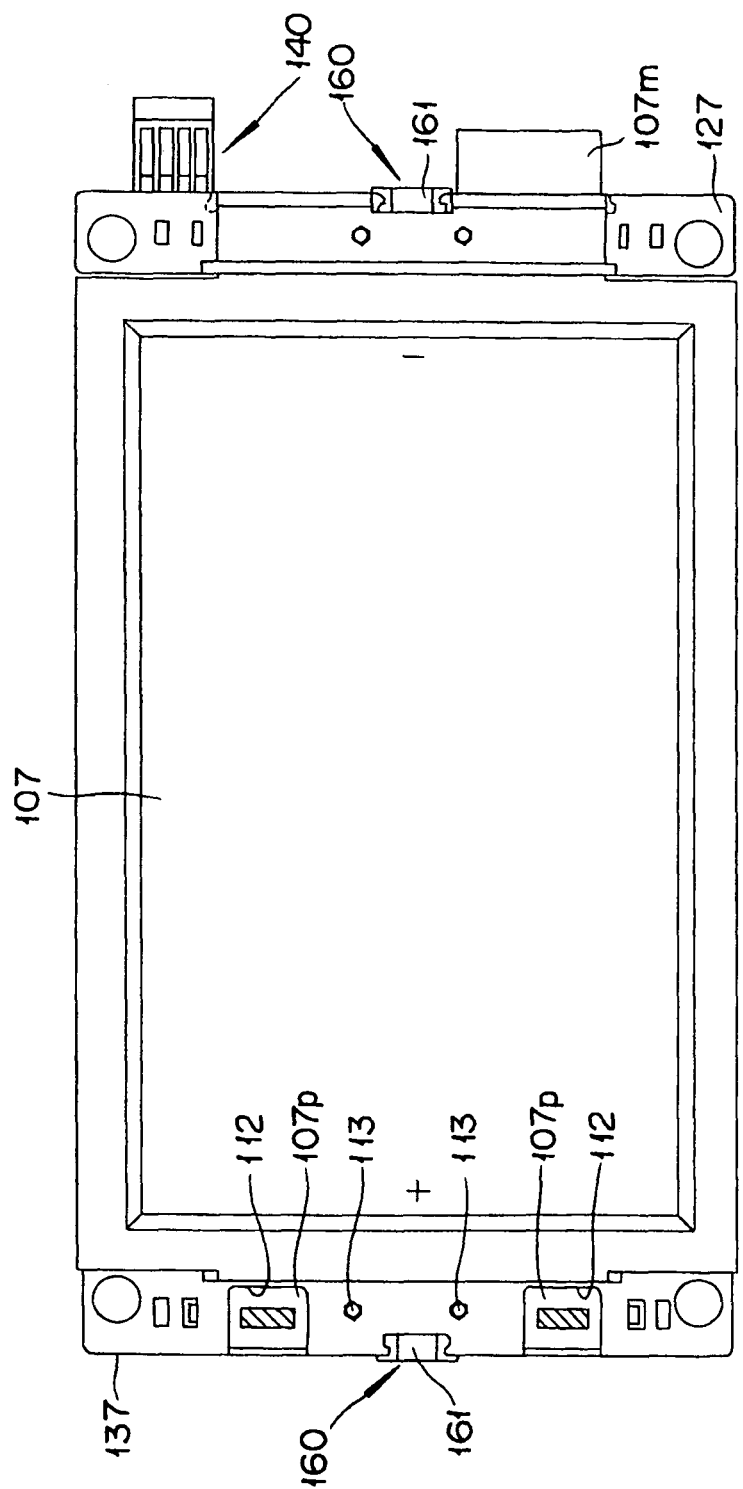
FIG. 36 is a plan view illustrating the assembling of the third sub-assembly subsequent to FIG. 35.

As shown in FIG. 35, at the back side, positive-side tab 107p and negative-side tab 108m are received and aligned by the seventeenth and eighteenth spacers 137 and 138. A portion of tabs 107p and 108m are received and retained within cutout region 112 of the seventeenth and eighteenth spacers 137 and 138. Tab 107p has a cutout portion 100b corresponding to terminal board 161 attached to negative-side tab 108m The pin 113 of the eighteenth spacer 138 is inserted through the through-holes 109 and 162 of tab 108m and terminal plate 161 and into the concave portion 114 of the seventeenth spacer 137, thus tightening tabs 107p and 108m to each other. The seventh battery 107 and the eighth battery 108 may be bonded together by using a double-sided tape. As shown in FIG. 36, positive side tabs 107p and negative side tab 108m are joined together within the cutout region 112 via ultrasonic welding treatment, thus connecting the seventh battery 107 and the eighth battery 108 in series. In addition, at the front side, negative-side tab 107m is received by the seventh and eighth spacers 127 and 128 with a portion of the tab 107m extending beyond spacers 127 and 128 (shown in FIGS. 35 and 36). The pin 113 of the eighth spacer 128 is inserted through the through-holes 109 and 162 of tab 107m and terminal board 161 and into the concave portion 114 of the seventh spacer 127.

Figure 37:
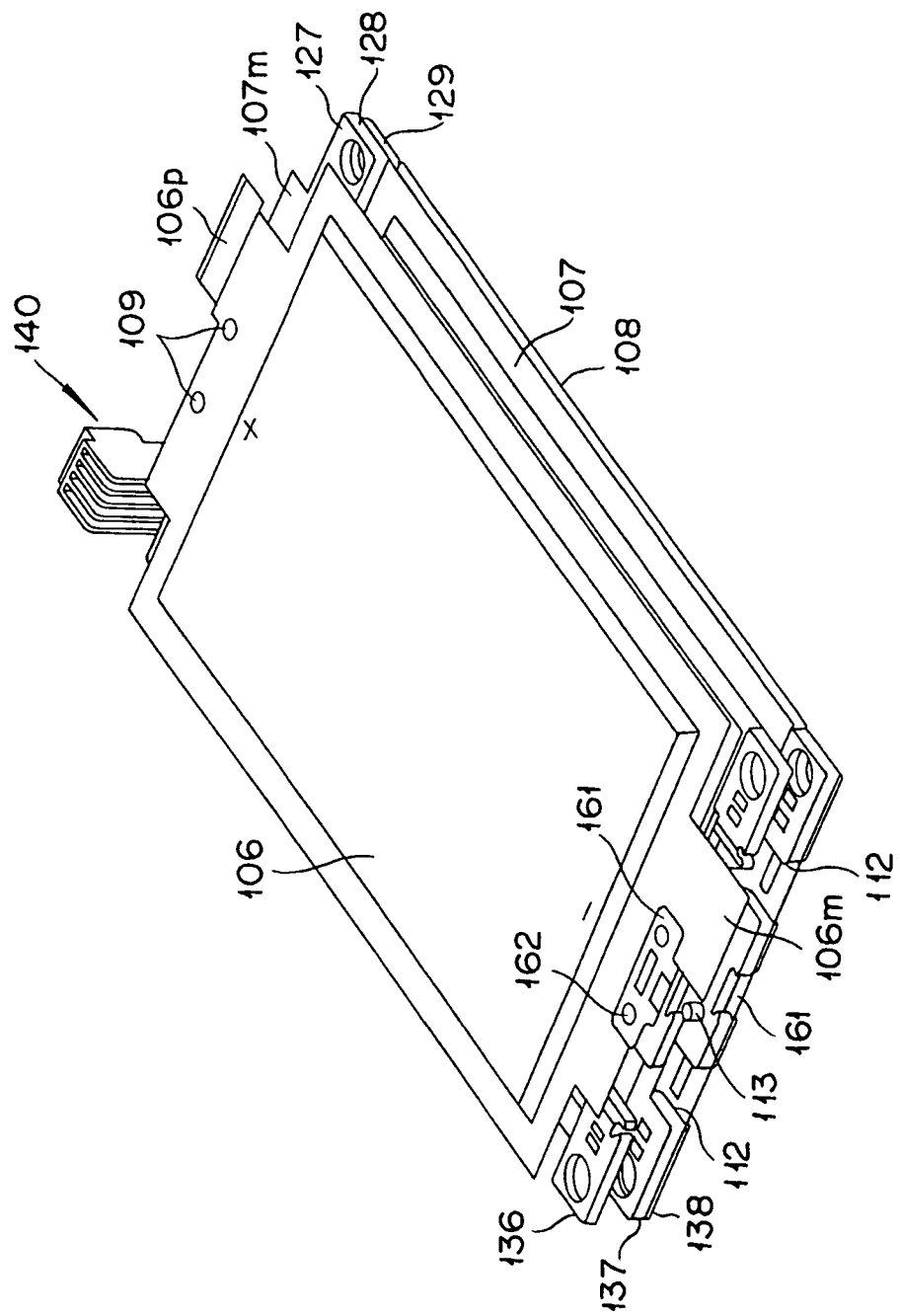
FIG. 37 is a perspective partial assembly view illustrating part of the third sub-assembly subsequent to FIG. 36.
Figure 38:
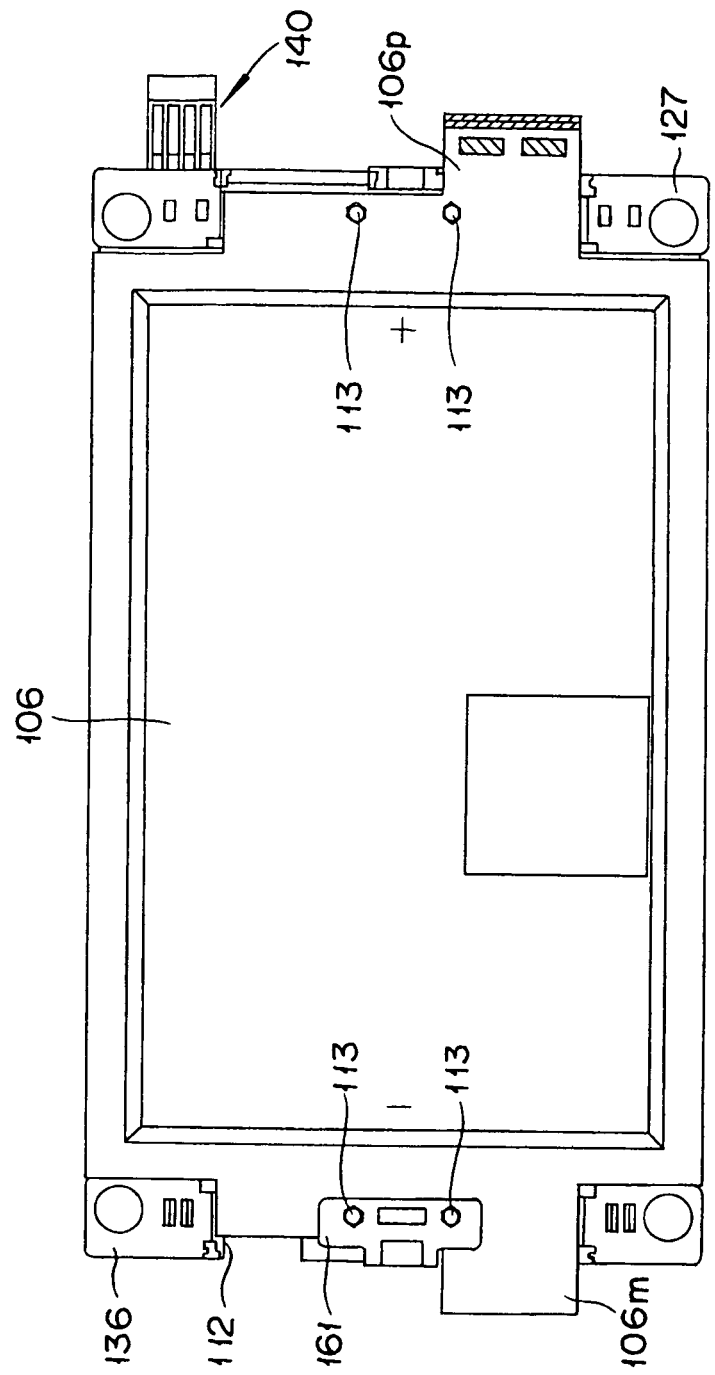
FIG. 38 is a plan view illustrating the assembling of the third sub-assembly subsequent to FIG. 37.

As shown in FIG. 37, at the back side, the sixteenth spacer 136 is stacked upon the seventeenth spacer 137. The pin 113 of the seventeenth spacer 137 is inserted into the concave portion 114 of the sixteenth spacer 136. Negative-side tab 106m is stacked upon the sixteenth spacer 136 with a portion of the tab 106m extending beyond spacer 136. The pin 113 of the sixteenth spacer 136 is inserted through the through-holes 109 and 162 of tab 106m and terminal board 161. The sixth battery 106 and the seventh battery 107 may be bonded together by using a double-sided tape. As shown in FIG. 38, at the front side, positive-side of the tab 106p is stacked upon the seventh spacer 127 with a portion of the tab 106p extending beyond spacer 127. The pin 113 of the seventh spacer 127 is inserted through the through-holes 109 of the tab 106p. In addition, positive side tab 106p, extending beyond spacers 127 and 128, and negative-side of the tab 107m are joined exterior to spacers 127 and 128 via ultrasonic welding treatment, thus connecting the sixth battery 106 and the seventh battery 107 in series. By implementing the above, the assembly of the third sub-assembly 83 can be completed.

Connection Among the Sub-Assemblies 81, 82 and 83

Referring now to FIGS. 6 to 8 and 11, when connecting the first sub-assembly 81 and the second sub-assembly 82 at the front side, the pin 113 of the fifth spacer 125 is inserted into the concave portion 114 of the fourth spacer 124. At the back side, the pin 113 of the fourteenth spacer 134 is inserted through the through holes 109 and 162 of negative side tab 104m and terminal board 161 and into the concave portion 114 of the thirteenth spacer 133. In addition, at the back side, positive-side tab 103p and negative-side tab 104m are joined exterior to spacers 130 to 135 via ultrasonic welding treatment, thus electrically connecting the first sub-assembly 81 and the second sub-assembly 82 in series.

In connecting the second sub-assembly 82 and the third sub-assembly 83 at the front side, the pin 113 of the seventh spacer 127 is inserted through the through-hole 109 of the positive side tab 106p and into the concave portion 114 of the sixth spacer 126. At the back side, the pin 113 of the sixteenth spacer 136 is inserted through the through-holes 109 and 162 of negative-side tab 106m and terminal board 161 and into the concave portion 114 of the fifteenth spacer 135. In addition, at the back side, positive-side tabs 105p and negative-side tab 106m of are joined exterior to spacers 130 to 138 via ultrasonic welding treatment, thus electrically connecting the first to third sub-assemblies 81, 82 and 83 in series.

By implementing the above, the connections among the sub-assemblies 81, 82 and 83 may be completed, and the cell unit 60 shown in FIG. 5 may be achieved.

In a particular embodiment, the joint among the tabs 100t, and the joint between the tab 100t and the bus bar 141 and 151, may be separated into various locations along the longitudinal direction of the batteries 100. Accordingly, when certain joints are welded via ultrasonic welding treatment, a group of tabs 100t may be engaged to each other by placing the welding head of a welding device at particular joints without opening and removing the other batteries along the stacked direction.

Therefore, the engagement process may be used when the batteries 100 are stacked, thereby facilitating the welding operation. In addition, various shapes and configurations of the welding head may be adopted, thus allowing the welding operation to be automated. Furthermore, stress is not further applied among the joined tabs 100t, thereby maintaining a desired quality.

Assembly of the Battery Module 50

The insulating covers 91 and 92, which cover tab 100t and open areas 200, may be assembled at the front and back surfaces of the cell units 60 (shown in FIGS. 5 and 22A).

As shown in FIG. 2, cell unit 60 formed as a unitary piece, with insulating covers 91 and 92 attached thereto, is received within the lower case 71. Further, the sleeve 93 is inserted into the bolt holes 111 of the spacers 110, and cushion member 94 is installed on the cell unit 60. The opening 71a of the lower case 71 is closed by the upper case 72. Upper case 72 and lower case 71 may be secured to each other by winding edge 72a of the upper case 72 around the edge 71c of the surrounding wall 71b of the lower case 71 and coking. As such, the assembly of the battery module 50 shown in FIG. 1 may be completed. The connector 170 may inserted from the insertion opening 91a and 92a for voltage detection.

The module may be further secured shut by insertion of a bolt through bolt holes 73 of case 70 and sleeve 93 within spacers 110, thereby fixing a position of the batteries 100 and spacers 110 relative to the case 70.

In the embodiments described above, each spacer 110 is described as including a cut-out 112. However, the inventor has recognized that as long as the opening 200 or the open area 200 exposes the tab 100t forward or backward of the cell unit (i.e., in a direction to which the tab 100t extends), heat-dissipation or cooling of the tab 100t may be achieved. Thus, the cut-out 112 may be provided in fewer than all of the spacers 110, for example the cut-out 112 might be formed only in one of the adjacent spacers 110 receiving and maintaining a tab 100t. In such an alternative embodiment, for example, it may be suitable that the cut-out 112 is provided in the ninth (front side) and eleventh (back side) spacers.

It has been recognized by the inventor that an opening 200 or an open area 200 should not be limited to an embodiment in which the cut-out 112 in the spacer 110 is extends entirely through the spacer in the stacked direction. As such an alternative embodiment is disclosed, in which perforated from the top surface of the spacer 110 tot the bottom surface is not cut, not molded and not otherwise formed all the way or completely through the spacer 110 in the stack direction.

Figure 39:
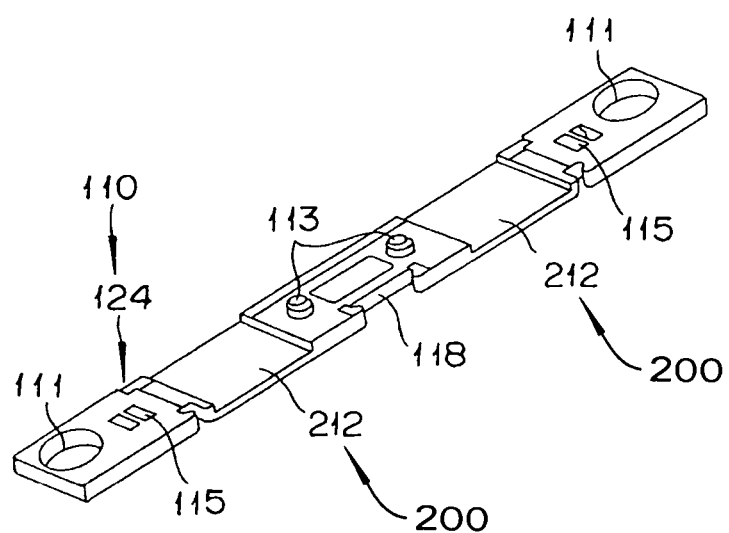
FIG. 39 is a perspective view showing a modified example shape of the insulating plate according to an alternative embodiment.

FIG. 39 is a perspective view showing an alternative embodiment in relation to the shape of the spacer 110. For example, as in the alternative embodiment shown in FIG. 39, a spacer 110 has a concave portion 212 that is formed into the spacer a sort distance in the thickness direction and at a location corresponding to one or more of the positive-side tab 100p and/or the negative-side tab 100m of the spacer 110. This results in an opening 200 or an open area 200. The spacer 110 having the concave portion 212, as shown in FIG. 39, may be used, for example, when tab 100t extends beyond spacer 110. Thus, the same working effect can be realized as might be realized for the cut-out 112. Similar to the open area 200 defined by the cut-out 112 (as shown in FIG. 18), the width of the concave portion 212, corresponding to the width S of the open area 200 formed by cut-out 112 in FIG. 18, should be shorter than the width W of the tab 100t.

Figure 40:
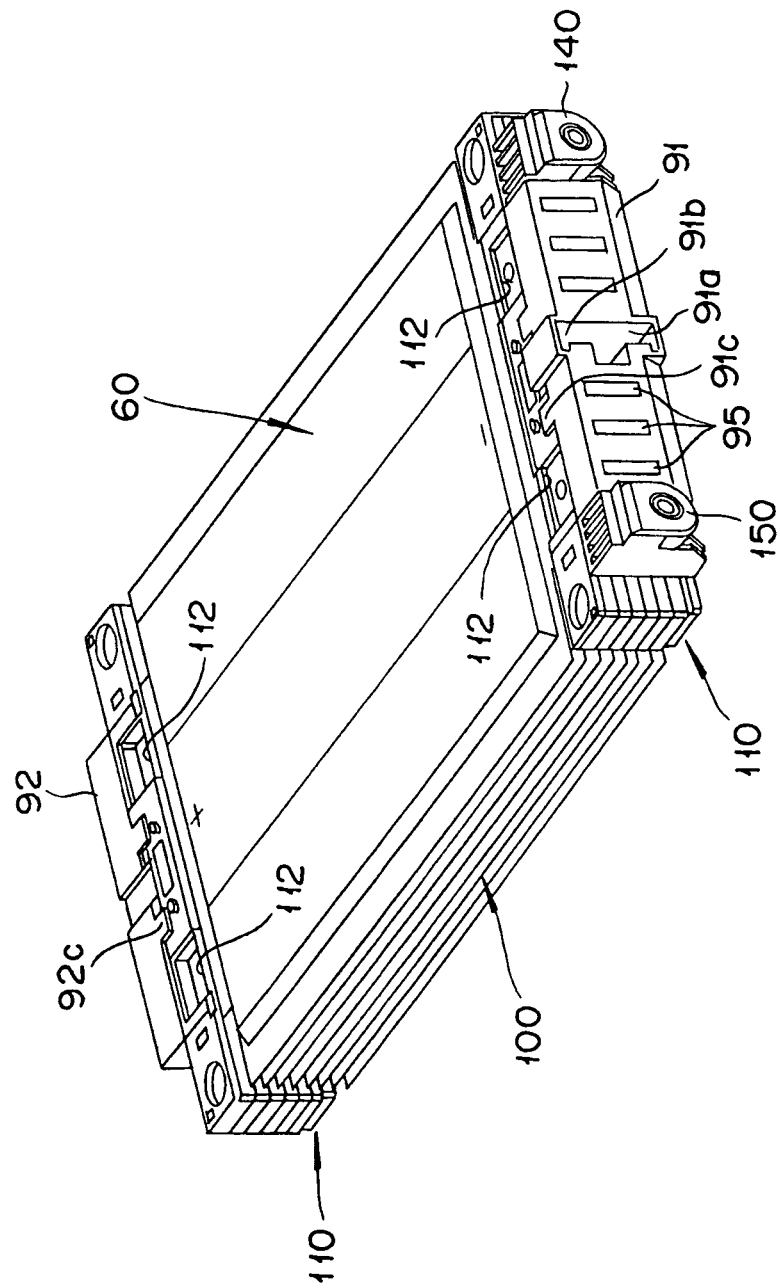
FIG. 40 is a perspective view showing the cell unit having the insulating cover according to the modified example of FIG. 39.

FIG. 40 is a perspective view showing cell unit 60, upon which the insulating covers 91 and 92 are attached, in accordance with another embodiment of the present disclosure. In various embodiments described above, through-holes 95 of the insulating covers 91 and 92 (as shown in FIG. 5) are formed in numerous groups extending elongated laterally to the left and right of the connector insertion opening 91a. However, one or more of the through-holes 95 should not be limited to such embodiments. For example, as shown in FIG. 40, the through-hole 95 is formed in numerous groups configured to be elongated in the vertical or stacked direction. In addition, insulation covers 91 and 92 are not required for some embodiments, such that positive-side tabs 100p, negative-side tabs 100m, and spacers 110 might not be covered with the insulating covers 91 and 92 in one or more alternative embodiments.

Usefully, embodiments disclosed herein may provide for at least one or a combination of more than one of the following. The use of spacers or insulating plates to receive the electrode terminals or tabs of the batteries may prevent the electrode terminals or tabs from being subjected to stress or fatigue caused by any vibrations applied to the battery module. Dampening of vibrations by use of the spacers and in combination with other features of the disclosed embodiments may improve the durability of the electrode terminal as well as the durability of the battery module. Furthermore, using insulating plates to receive the tabs or electrode terminals as disclosed may prevent or reduce the instances of short-circuiting among the electrode terminals or tabs. In instances where the instances of short circuiting are reduced or eliminated, a short or small vertical gap between the batteries and the terminals is allowed, and construction of a compact battery module may be facilitated. A compact battery module, which has an improved vibration resistance, may be provided. In addition, because insulating plates or spacers are located at both ends of batteries, exposure to the electrode terminals may be reduced, thereby easing handling of the cell unit during the assembly of the battery module and improving the quality.

The battery module may be configured to be loaded and used in a vehicle (e.g., car, train, etc.), which generates vibration to the cell unit. Battery modules may be connected to form a battery assembly having a desired current, voltage and capacity so as to serve, for example, as a power source for a motor used to drive a vehicle. When assembled, a plurality of batteries within a module and the plurality of battery modules may be spaced apart from each other such that the space serves as a passageway for flowing cooling air to cool each of the battery modules. Each of the battery modules is cooled and decreases in temperature by flowing cooling air, thereby preventing the degradation of battery charging efficiency by controlling the heat-degradation of the battery. Furthermore, by providing openings in the insulating plate in the direction in which the electrode terminals project, a portion of the electrode terminal is exposed, which may allow for the dissipation of heat from the electrode terminal that can result when charging or discharging a battery. In addition, it may prevent dew condensation on the electrode terminal, which can result from repeated heating and cooling of the electrode terminal, thereby preventing erosion of the batteries.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A battery module, comprising:
   a plurality of flat batteries stacked upon one another in a thickness direction and having an outer cover and plate-shaped electrode terminals connected to each other;

a power generating element sealed within the outer cover of each of the plurality of flat batteries, wherein the electrode terminals include substantially flat plates connected to the power generating element and projecting out of the outer cover in a projecting direction;

a bus bar that connects the electrode terminals of each of the plurality of flat batteries; and a plurality of electrically insulating spacers receiving the electrode terminals of more than one of the flat batteries and stacked in the thickness direction of the flat batteries, wherein at least one of the insulating spacers has at least one opening along a projecting direction of at least one of the electrode terminals so as to expose a portion of the at least one electrode terminal, wherein the electrically insulating spacers directly support the electrode terminals spaced from each other in the thickness direction of the flat batteries, and wherein a pair of adjacent spacers form a fixing mechanism that directly fixes tabs of the electrode terminals therebetween.

2. The battery module of claim 1, wherein the at least one opening is formed at a portion of the insulating spacers corresponding to the electrode terminal, and wherein the at least one opening is formed of a cut-out passing through the at least one insulating spacer in the thickness direction and is open along the projecting direction of the at least one electrode terminal to form an open volume adjacent to the at least one electrode terminal.

3. The battery module of claim 2, wherein a width of the cut-out of the at least one spacer is narrower than a width of the electrode terminal.

4. The battery module of claim 1, wherein the at least one opening is formed at a portion of the at least one insulating spacer corresponding to a location of the at least one electrode terminal, and wherein the at least one opening is formed of a concave portion partially into the at least one insulating spacer in the thickness direction and extends outward from the flat batteries in the projecting direction adjacent to the at least one electrode terminal.

5. The battery module of claim 4, wherein a width of the concave portion is narrower than a width of the electrode terminal.

6. The battery module of claim 1, further comprising a case configured to receive at least the plurality of flat batteries and the insulating spacers, wherein a space communicating with the at least one opening is formed between an inner wall of the case and the plurality of flat batteries.

7. The battery module of claim 6, wherein the case is formed with a through hole on a surface correspondingly adjacent to the at least one opening of the at least one insulating spacer.

8. The battery module of claim 6, wherein the case comprises a receiving portion having walls and a cover portion sized and configured to connect to the walls of the receiving portion with the plurality of stacked flat batteries pressed together therein.

9. The battery module of claim 1, further comprising at least one electrically insulating cover overlaying the electrode terminals outward from the insulating spacers in the electrode projecting direction, the insulating cover comprising at least one through hole on a surface of the insulating cover opposite to and overlaying the at least one opening of the at least one insulating spacer.

10. The battery module of claim 9, comprising
a case having an interior and an exterior for receiving the plurality of stacked flat batteries into the interior of the case, and
at least one open volume passing through the at least one insulating cover in the electrode projecting direction wherein the at least one open volume is in fluid communication with the interior of the case through the at least one opening in the at least one insulating spacer so that cooling fluid may pass therethrough.

11. The battery module of claim 9, comprising
a case having walls for receiving the plurality of batteries, wherein the flat batteries comprise a stacked anode plate and a cathode plate with a separator therebetween, the anode plate and the cathode plate connected to electrode terminals projecting from each of the plurality of batteries in two opposite directions with both opposite directions being orthogonal to the thickness direction, and
wherein the at least one insulating cover comprises two insulating covers one overlaying the electrode terminals in one opposed direction outward from the electrode terminals in one electrode projecting direction, the other insulating cover overlaying the electrode terminals in the opposed electrode projecting direction, the two insulating covers interposed between the walls of the case to insulate the terminals from contact with the walls of the case, and each of the insulating covers having at least one through hole on a surface of the insulating cover opposite to the electrode terminals of the batteries in both opposite directions.

12. The battery module of claim 1, wherein:
the plurality of electrically insulating spacers receive the electrode terminals of all of the flat batteries stacked in the thickness direction of the flat batteries, and wherein
more than one of the plurality of insulating spacers has an opening along a projecting direction of the electrode terminals so as to expose a portion of more than one of the electrode terminals while supporting the electrode terminals spaced from each other in the thickness direction of the flat batteries.

13. The battery module of claim 1, wherein:
the plurality of electrically insulating spacers receive the electrode terminals of all of the flat batteries stacked in the thickness direction of the flat batteries, and wherein
each of the plurality of insulating spacers have an opening along a projecting direction of the electrode terminals so as to expose a portion of each of the electrode terminals while supporting the electrode terminals spaced from each other in the thickness direction of the flat batteries.

14. The battery module of claim 1, comprising a control connector receiving opening.

15. The battery module of claim 14, wherein the control connector receiving opening comprises a voltage detection connector receiving opening.

16. A method of forming a battery module comprising:
stacking a plurality of flat batteries upon one another in a thickness direction, the stacked batteries having an outer cover and plate-shaped electrode terminals projecting outward from the flat batteries in a projecting direction;
connecting the electrode terminals of the flat batteries via a bus bar to form a battery module,
receiving each of the electrode terminals into each of a plurality of electrically insulating spacers interposed between the electrode terminals of the flat batteries in the thickness direction of the flat batteries, and
forming at least one opening in at least one of the insulating spacers along a projecting direction of at least one of the electrode terminals so as to expose a portion of the at least one electrode terminal, wherein the electrically insulating spacers directly support the electrode terminals spaced from each other in the thickness direction of the flat batteries, and wherein a pair of adjacent spacers form a fixing mechanism that directly fixes tabs of the electrode terminals therebetween.

17. The method of forming a battery module of claim 16, wherein forming at least one opening in at least one of the plurality of insulating spacer comprises forming more than one opening in more than one of the plurality of spacers so as to expose a portion of more than one electrode terminal while supporting the plurality of electrode terminals in the thickness direction.

18. The method of forming a battery module of claim 16, further comprising attaching an insulating cover overlying the electrode terminals and insulating spacers outward in the terminal projecting direction, wherein the insulating cover has an open area therethrough in the electrode projecting direction and the open area is in fluid communication with the at least one opening in the at least one insulating spacer, inserting the plurality of batteries, the spacers and the insulating cover into a case so that the electrode terminals are insulated by the insulating cover from the case, and wherein forming an opening in the case from the interior to the exterior so that the at least one open volume and the at least one opening in the at least one spacer is in fluid communication with the opening formed in the case.

19. A battery module, comprising:

a means for stacking a plurality of flat batteries upon one another in a thickness direction and for connecting an outer cover and plate-shaped electrode terminals to each other;

a means for generating power sealed within the outer cover of each of the plurality of flat batteries, wherein the electrode terminals include substantially flat plates connected to the power generating element and projecting out of the outer cover in a projecting direction;

a bus bar that connects the electrode terminals of each of the plurality of flat batteries; and a plurality of means for electrically insulating spacing and receiving the electrode terminals of more than one of the flat batteries and stacked in the thickness direction of the flat batteries, wherein at least one of means for electrically insulating, spacing, and receiving the electrode terminals of more than one of the flat batteries further has at least one means along a projecting direction of at least one of the electrode terminals for exposing a portion of the at least one electrode terminal, wherein the plurality of means for electrically insulating directly support the electrode terminals spaced from each other in the thickness direction of the flat batteries, wherein a pair of adjacent spacers form a fixing means for directly fixing tabs of the electrode terminals therebetween.

* * * * *